(12) United States Patent
Zhamu et al.

(10) Patent No.: US 9,922,775 B2
(45) Date of Patent: Mar. 20, 2018

(54) CONTINUOUS PROCESS FOR PRODUCING ELECTRODES FOR SUPERCAPACITORS HAVING HIGH ENERGY DENSITIES

(71) Applicants: Aruna Zhamu, Springboro, OH (US); Bor Z Jang, Centerville, OH (US)

(72) Inventors: Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

(21) Appl. No.: 14/756,777

(22) Filed: Oct. 13, 2015

(65) Prior Publication Data
US 2017/0103856 A1    Apr. 13, 2017

(51) Int. Cl.
| | |
|---|---|
| *H01G 11/50* | (2013.01) |
| *H01G 11/02* | (2013.01) |
| *H01G 11/26* | (2013.01) |
| *H01G 11/36* | (2013.01) |
| *H01G 11/46* | (2013.01) |
| *H01G 11/58* | (2013.01) |
| *H01G 11/86* | (2013.01) |

(52) U.S. Cl.
CPC ............ *H01G 11/50* (2013.01); *H01G 11/02* (2013.01); *H01G 11/26* (2013.01); *H01G 11/36* (2013.01); *H01G 11/46* (2013.01); *H01G 11/58* (2013.01); *H01G 11/86* (2013.01)

(58) Field of Classification Search
CPC ........ H01G 11/00; H01G 11/24; H01G 11/30; H01G 11/32; H01G 11/34; H01G 11/48; H01G 11/62; H01G 11/50; H01G 11/02; H01G 11/26; H01G 11/36; H01G 11/46; H01G 11/58; H01G 11/86
See application file for complete search history.

(56) References Cited

U.S. PATENT DOCUMENTS

| | | |
|---|---|---|
| 7,071,258 B1 | 7/2006 | Jang et al. |
| 7,623,340 B1 | 11/2009 | Song et al. |
| 2005/0064289 A1 | 3/2005 | Suzuki et al. |
| 2008/0218938 A1 | 9/2008 | Kazaryan et al. |
| 2009/0059474 A1 | 3/2009 | Zhamu et al. |

(Continued)

OTHER PUBLICATIONS

International Search Report, PCT/US2016/053669, dated Dec. 27, 2016.

(Continued)

*Primary Examiner* — Scott B Geyer

(57) ABSTRACT

A process for producing a supercapacitor cell, comprising: (a) Continuously feeding a conductive porous layer to a cathode material impregnation zone, wherein the conductive porous layer contains interconnected electron-conducting pathways and at least 70% by volume of pores; (b) Impregnating a wet cathode active material mixture (containing a cathode active material and an optional conductive additive mixed with a liquid electrolyte) into pores of this porous layer to form a cathode electrode; (c) Preparing an anode electrode in a similar manner; and (d) Stacking an anode electrode, a porous separator, and a cathode electrode to form the supercapacitor, wherein the anode electrode and/or the cathode electrode has a thickness no less than 100 μm; and/or wherein the anode or cathode active material constitutes an electrode active material loading no less than 7 mg/cm² in the anode or the cathode.

31 Claims, 22 Drawing Sheets

(56) References Cited

U.S. PATENT DOCUMENTS

| | | |
|---|---|---|
| 2009/0061312 A1 | 3/2009 | Zhamu et al. |
| 2009/0092747 A1 | 4/2009 | Zhamu et al. |
| 2009/0271961 A1 | 11/2009 | Kondou et al. |
| 2010/0021819 A1 | 1/2010 | Zhamu et al. |
| 2010/0238606 A1 | 9/2010 | Dreissig et al. |
| 2012/0154982 A1 | 6/2012 | Nobuhiro et al. |
| 2012/0244429 A1 | 9/2012 | Lam et al. |
| 2013/0183226 A1 | 7/2013 | Todoriki et al. |
| 2013/0216894 A1 | 8/2013 | Wang et al. |
| 2014/0266075 A1 | 9/2014 | Gellet et al. |

OTHER PUBLICATIONS

Chen, Z. et. al. "Three-dimensional flexible and conductive interconnected graphene networks grown by chemical vapour deposition", Nat. Materials. 10, 424-428 (2001).

Metal grid; scale = 200 μm

Carbon nano-fiber mat; fiber diameter = 150 nm

Graphene foam; 100 μm

Carbon foam

Graphite foam

Ni foam

Cu foam

Stainless steel foam

CONTINUOUS PROCESS FOR PRODUCING ELECTRODES FOR SUPERCAPACITORS HAVING HIGH ENERGY DENSITIES

FIELD OF THE INVENTION

The present invention relates generally to the field of supercapacitors or ultracapacitors, and more particularly to the production processes for supercapacitor electrodes and cells.

BACKGROUND OF THE INVENTION

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but supercapacitors (with their ability to release energy much more quickly than batteries) would kick in whenever the car needs to accelerate for merging, passing, emergency maneuvers, and hill climbing. The EC must also store sufficient energy to provide an acceptable driving range. To be cost-, volume-, and weight-effective compared to additional battery capacity they must combine adequate energy densities (volumetric and gravimetric) and power densities with long cycle life, and meet cost targets as well.

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC relative to conventional capacitors (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation." Such a supercapacitor is commonly referred to as an electric double layer capacitor (EDLC). The double layer capacitor is based on a high surface area electrode material, such as activated carbon, immersed in a liquid electrolyte. A polarized double layer is formed at electrode-electrolyte interfaces providing high capacitance. This implies that the specific capacitance of a supercapacitor is directly proportional to the specific surface area of the electrode material. This surface area must be accessible by electrolyte and the resulting interfacial zones must be sufficiently large to accommodate the so-called electric double-layer charges.

In some ECs, stored energy is further augmented by pseudo-capacitance effects, occurring again at the solid-electrolyte interface due to electrochemical phenomena such as the redox charge transfer.

However, there are several serious technical issues associated with current state-of-the-art ECs or supercapacitors:

(1) Experience with ECs based on activated carbon electrodes shows that the experimentally measured capacitance is always much lower than the geometrical capacitance calculated from the measured surface area and the width of the dipole layer. For very high surface area carbons, typically only about 10-20 percent of the "theoretical" capacitance was observed. This disappointing performance is related to the presence of micro-pores (<2 nm, mostly <1 nm) and ascribed to inaccessibility of some pores by the electrolyte, wetting deficiencies, and/or the inability of a double layer to form successfully in pores in which the oppositely charged surfaces are less than about 1-2 nm apart. In activated carbons, depending on the source of the carbon and the heat treatment temperature, a surprising amount of surfaces can be in the form of such micro-pores.

(2) Despite the high gravimetric capacitances at the electrode level (based on active material weights alone) as frequently claimed in open literature and patent documents, these electrodes unfortunately fail to provide energy storage devices with high capacities at the supercapacitor cell or pack level (based on the total cell weight or pack weight). This is due to the notion that, in these reports, the actual massloadings of the electrodes and the apparent densities for the active materials are too low. In most cases, the active material mass loadings of the electrodes (areal density) is significantly lower than 10 mg/cm$^2$ (areal density=the amount of active materials per electrode cross-sectional area along the electrode thickness direction) and the apparent volume density or tap density of the active material is typically less than 0.75 g/cm$^{-3}$ (more typically less than 0.5 g/cm$^{-3}$ and most typically less than 0.3 g/cm$^{-3}$) even for relatively large particles of activated carbon.

The low mass loading is primarily due to the inability to obtain thicker electrodes (thicker than 100-200 μm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. These problems are particularly acute for graphene material-based electrodes. It has not been previously possible to produce graphene-based electrodes that are thicker than 150 μm and remain highly porous with pores remaining fully accessible to liquid electrolyte. The low areal densities and low volume densities (related to thin electrodes and poor packing density) result in relatively low volumetric capacitances and low volumetric energy density of the supercapacitor cells.

With the growing demand for more compact and portable energy storage systems, there is keen interest to increase the utilization of the volume of the energy storage devices. Novel electrode materials and designs that enable high volumetric capacitances and high mass loadings are essential to achieving improved cell volumetric capacitances and energy densities.

(3) During the past decade, much work has been conducted to develop electrode materials with increased volumetric capacitances utilizing porous carbon-based materials, such as graphene, carbon nanotube-based composites, porous graphite oxide, and porous meso carbon. Although these experimental supercapacitors featuring such electrode materials can be charged and discharged at high rates and also exhibit large volumetric electrode capacitances (100 to 200 F/cm$^3$ in most cases, based on the electrode volume), their typical active mass loading of <1 mg/cm$^2$, tap density of <0.2 g/cm$^{-3}$, and electrode thicknesses of up to tens of micrometers (<<100 μm) are still significantly lower than those used in most commercially available electrochemical capacitors (i.e. 10 mg/cm$^2$, 100-200 μm), which results in energy storage devices with relatively low areal and volumetric capacitances and low volumetric energy densities.

(4) For graphene-based supercapacitors, there are additional problems that remain to be solved, explained below:

Nano graphene materials have recently been found to exhibit exceptionally high thermal conductivity, high electrical conductivity, and high strength. Another outstanding characteristic of graphene is its exceptionally high specific surface area. A single graphene sheet provides a specific external surface area of approximately 2,675 m$^2$/g (that is accessible by liquid electrolyte), as opposed to the exterior surface area of approximately 1,300 m$^2$/g provided by a corresponding single-wall CNT (interior surface not accessible by electrolyte). The electrical conductivity of graphene is slightly higher than that of CNTs.

The instant applicants (A. Zhamu and B. Z. Jang) and their colleagues were the first to investigate graphene- and other nano graphite-based nano materials for supercapacitor application [Please see Refs.1-5 below; the 1$^{st}$ patent application was submitted in 2006 and issued in 2009]. After 2008, researchers began to realize the significance of nano graphene materials for supercapacitor applications.

LIST OF REFERENCES

1. Lulu Song, A. Zhamu, Jiusheng Guo, and B. Z. Jang "Nano-scaled Graphene Plate Nanocomposites for Supercapacitor Electrodes" U.S. Pat. No. 7,623,340 (Nov. 24, 2009).
2. Aruna Zhamu and Bor Z. Jang, "Process for Producing Nano-scaled Graphene Platelet Nanocomposite Electrodes for Supercapacitors," U.S. patent application Ser. No. 11/906,786 (Oct. 4, 2007).
3. Aruna Zhamu and Bor Z. Jang, "Graphite-Carbon Composite Electrodes for Supercapacitors" U.S. patent application Ser. No. 11/895,657 (Aug. 27, 2007).
4. Aruna Zhamu and Bor Z. Jang, "Method of Producing Graphite-Carbon Composite Electrodes for Supercapacitors" U.S. patent application Ser. No. 11/895,588 (Aug. 27, 2007).
5. Aruna Zhamu and Bor Z. Jang, "Graphene Nanocomposites for Electrochemical cell Electrodes," U.S. patent application Ser. No. 12/220,651 (Jul. 28, 2008).

However, individual nano graphene sheets have a great tendency to re-stack themselves, effectively reducing the specific surface areas that are accessible by the electrolyte in a supercapacitor electrode. The significance of this graphene sheet overlap issue may be illustrated as follows: For a nano graphene platelet with dimensions of l (length)×w (width)×t (thickness) and density ρ, the estimated surface area per unit mass is $S/m=(2/\rho)(1/l+1/w+1/t)$. With $\rho \cong 2.2$ g/cm$^3$, l=100 nm, w=100 nm, and t=0.34 nm (single layer), we have an impressive S/m value of 2,675 m$^2$/g, which is much greater than that of most commercially available carbon black or activated carbon materials used in the state-of-the-art supercapacitor. If two single-layer graphene sheets stack to form a double-layer graphene, the specific surface area is reduced to 1,345 m$^2$/g. For a three-layer graphene, t=1 nm, we have S/m=906 m$^2$/g. If more layers are stacked together, the specific surface area would be further significantly reduced.

These calculations suggest that it is critically important to find a way to prevent individual graphene sheets to re-stack and, even if they partially re-stack, the resulting multi-layer structure would still have inter-layer pores of adequate sizes. These pores must be sufficiently large to allow for accessibility by the electrolyte and to enable the formation of electric double-layer charges, which typically require a pore size of at least 1 nm, more preferably at least 2 nm. However, these pores or inter-graphene spacings must also be sufficiently small to ensure a large tap density (electrode mass per unit volume). Unfortunately, the typical tap density of graphene-based electrode is less than 0.3 g/cm$^3$, and most typically <<0.1 g/cm$^3$. To a great extent, the requirement to have large pore sizes and high porosity level and the requirement to have a high tap density are considered mutually exclusive in supercapacitors.

Another major technical barrier to using graphene sheets as a supercapacitor electrode active material is the challenge of depositing a thick active material layer onto the surface of a solid current collector (e.g. Al foil) using the conventional graphene-solvent slurry coating procedure. In such an electrode, the graphene electrode typically requires a large amount of a binder resin (hence, significantly reduced active material proportion vs. non-active or overhead materials/components). In addition, any electrode prepared in this manner that is thicker than 50 μm is brittle and weak, having a great tendency to delaminate and micro-crack. These characteristics have made the supercapacitor electrode thickness not a design parameter, but a manufacturing-limited feature. A supercapacitor designer cannot freely increase the electrode thickness. There has been no effective solution to these problems.

Therefore, there is a clear and urgent need for supercapacitors that have a high active material mass loading (high areal density), active materials with a high apparent density (high tap density), high electrode thickness with structural integrity and without significantly decreased electron and ion transport rates (e.g. without large electron transport resistance), high volumetric capacitance, and high volumetric energy density. For graphene-based electrodes, one must also overcome problems such as re-stacking of graphene sheets, the demand for large proportion of a binder resin, and difficulty in producing thick graphene electrode layers.

SUMMARY OF THE INVENTION

The present invention provides a process for producing electrodes of a supercapacitor cell and further for producing the supercapacitor cell having a high active material mass loading, exceptionally low overhead (ancillary component) weight and volume (relative to the active material mass and volume), high volumetric capacitance, and unprecedentedly high volumetric energy density.

In one embodiment, the invented process comprises: (A) Continuously feeding a first electrically conductive porous layer to a cathode material impregnation zone, wherein the first conductive porous layer has two opposed porous surfaces and contains interconnected electron-conducting pathways and, preferably, at least 70% by volume of pores; (B) Impregnating a wet cathode active material mixture into the first electrically conductive porous layer from at least one of the two porous surfaces to form a cathode electrode, wherein the wet cathode active material mixture contains a cathode active material and an optional conductive additive mixed with a first liquid electrolyte; (C) Continuously feeding a second electrically conductive porous layer to an anode material impregnation zone, wherein the second conductive porous layer has two opposed porous surfaces and contains interconnected electron-conducting pathways and, preferably, at least 70% by volume of pores; (D) Impregnating a wet anode active material mixture into the second electrically conductive porous layer from at least one of the two porous surfaces to form an anode electrode, wherein the wet anode active material mixture contains an anode active material and an optional conductive additive mixed with a second liquid electrolyte; and (E) Stacking an anode electrode, a porous separator, and a cathode electrode to form an alkali metal battery, wherein the anode electrode and/or the cathode electrode has a thickness no less than 100 µm and/or wherein the anode active material or cathode active material constitutes an electrode active material loading no less than 7 mg/cm² in the anode or cathode electrode.

The steps (A) and (B) combined, or (C) and (D) combined, constitute a process for producing the respective electrode (cathode or anode). Thus, the present invention also provides a process for producing an electrode for a supercapacitor cell, the process comprising: (A) Continuously feeding an electrically conductive porous layer to an anode or cathode material impregnation zone, wherein the conductive porous layer has two opposed porous surfaces and contains interconnected electron-conducting pathways and, preferably, at least 70% by volume of pores; and (B) Impregnating a wet anode or cathode active material mixture into the electrically conductive porous layer from at least one of the two porous surfaces to form an anode electrode or cathode electrode, wherein the wet anode or cathode active material mixture contains an anode or cathode active material and an optional conductive additive mixed with a liquid electrolyte.

In the electrode-producing process or the cell-producing process, step (A) and step (B) include delivering, continuously or intermittently on demand, the wet cathode active material mixture to the at least one porous surface through spraying, printing, coating, casting, conveyor film delivery, and/or roller surface delivery. The step (C) and step (D) may also include delivering, continuously or intermittently on demand, the wet anode active material mixture to at least one porous surface through spraying, printing, coating, casting, conveyor film delivery, and/or roller surface delivery.

The first conductive porous layer and the second conductive porous layer can be made of the same material or different materials. Each layer contains interconnected 2D or 3D network of electron-conducting paths as a cathode current collector or anode current collectors having pores to accommodate liquid electrolyte and a cathode active material or an anode active material. The first and/or second conductive porous layer has a thickness no less than 100 µm (preferably greater than 200 µm, more preferably greater than 300 µm, further preferably greater than 400 µm, still more preferably greater than 500 µm, and most preferably up to 5,000 µm or 5 mm (actually, there is no limitation on the porous layer thickness or final electrode thickness). The conductive porous layer preferably has at least 70% by volume of pores (more preferably at least 80% porosity, still more preferably at least 90%, and most preferably at least 95%).

In some embodiments, the anode active material and/or the cathode active material contains multiple particles of a carbon material and/or multiple graphene sheets, wherein the multiple graphene sheets contain single-layer graphene or few-layer graphene (each having from 1 to 10 graphene planes) and the multiple particles of carbon material have a specific surface area no less than 500 m²/g (preferably >1,000 m²/g, more preferably >1,500 m²/g, further more preferably >2,000 m²/g, still more preferably >2,500 m²/g, and most preferably more preferably >3,000 m²/g) when measured in a dried state (the practical limit is 3,500 m²/g for carbon-based materials). In the final electrode, the anode active material or the cathode active material constitutes an electrode active material loading no less than 7 mg/cm² (preferably no less than 10 mg/cm², more preferably no less than 15 mg/cm², further more preferably no less than 20 mg/cm², still more preferably no less than 25 mg/cm², and most preferably no less than 30 mg/cm²) in the anode or the cathode.

The electrically conductive porous layer herein refers to a structure that contains a high pore volume (>70% or more) and an interconnected network of electron-conducting paths. This can be, for instance, end-connected 2D mats, webs, chicken wire-like metal screens, etc. As illustrated in FIG. 3(A)-(D), this can also be metal foam, conductive polymer foam, graphite foam, carbon foam, or graphene foam, etc., wherein pore walls contain conductive materials. The pore volume (e.g. >70%) of a conductive porous layer (serving as a current collector) is a critically important requirement to ensure a large proportion of active materials being accommodated in the current collector. Based on this criterion, conventional paper or textiles made of natural and/or synthetic fibers do not meet this requirement since they do not have a sufficient amount of properly sized pores.

The pore sizes in the first and/or second conductive porous layers are preferably in the range from 10 nm to 50 µm, more preferably from 100 nm to 20 µm, further preferably from 500 nm to 10 µm, and most preferably from 1 µm to 5 µm. These pore size ranges are designed to accommodate graphene sheets, which are typically from 10 nm to 50 µm in length/width and most typically from 100 nm to 20 µm, further typically from 200 nm to 10 µm, and most typically from 0.5 µm to 5 µm. More significantly, however, since all active material particles (e.g. graphene sheets, carbon particles, etc.) are, on average, within a distance of 25 µm from a pore wall in the 3D foam structure, electrons (charges) can be readily collected from the electric double layers near the active material-electrolyte interface. This is in contrast to the notion that some electrons in the conventional thick electrode of prior art supercapacitors (e.g. wherein an activated carbon layer >100 µm in thickness is coated onto a surface of a solid Al foil current collector 12 µm thick) must travel at least 100 µm to get collected by a current collector (meaning a larger internal resistance and reduced ability to deliver a higher power).

In general, the wet anode active material mixture and the wet cathode active material mixture are identical in composition in a symmetric supercapacitor, but they can be different in composition. The liquid electrolytes can be an aqueous liquid, organic liquid, ionic liquid (ionic salt having a melting temperature lower than 100° C., preferably lower than room temperature, 25° C.), or mixture of an ionic liquid and an organic liquid at a ratio from 1/100 to 100/1. The organic liquid is desirable, but the ionic liquid is preferred.

A supercapacitor active material is a material responsible for storing charges via the nearby electric double layers or via the redox mechanism in the supercapacitor cell. As an active material, the carbon material may be selected from activated carbon, activated meso-carbon micro beads (activated MCMBs), activated graphite, activated or chemically etched carbon black, activated hard carbon, activated soft carbon, carbon nanotube, carbon nano-fiber, activated carbon fiber, activated graphite fiber, exfoliated graphite worms, activated graphite worms, activated expanded graphite flakes, or a combination thereof.

In a preferred embodiment, the first and/or second conductive porous layer has a thickness no less than 200 μm, has at least 85% by volume of pores (prior to impregnation of the wet electrode active material mixture), and/or the electrode active material loading is no less than 10 mg/cm². Preferably, the active material in the two electrodes (anode and cathode) combined occupies at least 30% by weight or by volume of the entire supercapacitor cell. This weight or volume proportion of the active material is preferably no less than 40%, further preferably no less than 50%, and mote preferably no less than 60%. These have not been possible with conventional supercapacitors.

In a further preferred embodiment, the first and/or second conductive porous layer structure has a thickness no less than 300 μm, has at least 90% by volume of pores, and/or the electrode active material loading is no less than 15 mg/cm².

In a more preferred embodiment, the first and/or second conductive porous layer structure has a thickness no less than 400 μm, has at least 95% by volume of pores, and/or the electrode active material loading is no less than 20 mg/cm². The conductive porous layer thickness is most preferably from 400 μm to 5 mm.

In certain embodiments, the first and/or second conductive porous layer structure is selected from metal foam, metal web or screen, perforated metal sheet-based 3-D structure, metal fiber mat, metal nanowire mat, conductive polymer nano-fiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

As a supercapacitor active material, graphene sheets may be selected from the group consisting of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, physically or chemically activated or etched versions thereof, and combinations thereof. In an embodiment, the anode or the cathode contains graphene sheets as the only electrode active material and does not contain any other electrode active material.

In certain embodiments, the anode or the cathode contains the following materials as the only electrode active material in the anode or cathode: (a) graphene sheets alone; (b) graphene sheets mixed with a carbon material; (c) graphene sheets mixed with a partner material that forms a redox pair with the graphene sheets to develop pseudo-capacitance; or (d) graphene sheets and a carbon material mixed with a partner material (e.g. a conducting polymer or metal oxide) that forms a redox pair with graphene sheets or the carbon material to develop pseudo-capacitance, and wherein there is no other electrode active material in the anode or cathode.

The anode active material and the cathode active material can be the same material or different materials. Preferably, the volume ratio of the anode active material-to-liquid electrolyte in the first dispersion is from 1/5 to 20/1 (preferably from 1/3 to 5/1) and/or the volume ratio of cathode active material-to-the liquid electrolyte in the second dispersion is from 1/5 to 20/1 (preferably from 1/3 to 5/1).

In certain embodiments, the anode active material or cathode active material contains a carbon and/or graphene material and further contains a redox pair partner material selected from a metal oxide, a conducting polymer, an organic material, a non-graphene carbon material, an inorganic material, or a combination thereof, wherein the partner material, in combination with graphene or a carbon material, form a redox pair for developing pseudo-capacitance. The metal oxide may be selected from $RuO_2$, $IrO_2$, $NiO$, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, or a combination thereof. The inorganic material may be selected from a metal carbide, metal nitride, metal boride, metal dichalcogenide, or a combination thereof. Conducting polymers preferably contain an intrinsically conductive polymer, such as polyacetylene, polypyrrole, polyaniline, polythiophene, or their derivatives.

In some embodiments, the metal oxide or inorganic material may be selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. Preferably, the inorganic material is selected from nano discs, nano platelets, nano-coating, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm.

In an embodiment, we have a supercapacitor-type cathode (an electric double layer or redox pair type electrode), but the anode is a battery-like anode that intercalates/deintercalates lithium or sodium ions (e.g. containing pre-lithiated graphite particles, pre-sodiated carbon particles, or pre-lithiated Si particles) and the resulting supercapacitor is a lithium ion capacitor or sodium-ion capacitor (still a capacitor, not a battery). Thus, the invention also provides a process for producing a special class of supercapacitor cell (i.e. a lithium ion capacitor, LIC, or sodium-ion capacitor, NIC). The process includes: (A) Continuously feeding a first electrically conductive porous layer to a cathode material impregnation zone, wherein the first conductive porous layer has two opposed porous surfaces and contains interconnected electron-conducting pathways and, preferably, at least 70% by volume of pores; (B) Impregnating a wet cathode active material mixture into the first electrically conductive porous layer from at least one of the two porous surfaces to form a cathode electrode, wherein the wet cathode active material mixture contains a cathode active material and an optional conductive additive mixed with a first liquid electrolyte; (C) Continuously supplying an anode electrode, which contains a pre-lithiated or pre-sodiated anode active material; and (D) Stacking an anode electrode, a porous separator, and a cathode electrode to form a lithium-ion capacitor or sodium-ion capacitor, wherein the cathode electrode has a thickness no less than 100 μm (preferably >200 μm, more preferably >300 μm, further more preferably >400 μm, still more preferably >500 μm, and most preferably >600 μm) and the cathode active material constitutes an electrode active material loading no less than 7 mg/cm² in said cathode electrode. Preferably, the cathode active material constitutes an electrode active material loading no less than 10 mg/cm² (preferably >15 mg/cm², more preferably >20 mg/cm$^2$, still more preferably >25 mg/cm$^2$, and most preferably >30 mg/cm$^2$).

There are at least two ways to prepare the anode electrode layer; the conventional process and the presently invented process. The conventional process includes mixing graphite particles in NMP solvent to form a slurry, which is coated on one or two surfaces of an anode current collector (e.g. non-porous, thin Cu foil). The solvent is then removed to obtain dried electrode and a liquid electrolyte is injected into the anode side after the battery cell is assembled and housed in a packaging envelop. More preferably, the anode electrode for the presently invented LIC or NIC is also made by the presently invented process described above. This inventive process includes (A) Continuously feeding a second electrically conductive porous layer to an anode material impregnation zone, wherein the second conductive porous layer has two opposed porous surfaces and contain interconnected electron-conducting pathways and, preferably, at least 70% by volume of pores; and (B) Impregnating a wet anode active material mixture into the second electrically conductive porous layer from at least one of the two porous surfaces to form an electrode. The wet anode active material mixture contains a liquid electrolyte and an anode active material selected from prelithiated or pre-sodiated versions of graphite particles, carbon particles, Si nano particles, Sn nano particles, or any other commonly used anode active materials for lithium-ion batteries or sodium-ion batteries.

In a lithium-ion capacitor (LIC), the anode active material may be selected from the group consisting of (a) Pre-lithiated particles of natural graphite, artificial graphite, meso-carbon microbeads (MCMB), and carbon; (b) Pre-lithiated particles or coating of Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (c) Pre-lithiated alloys or intermetallic compounds of Si, Ge, Sn, Pb, Sb, Bi, Zn, Al, or Cd with other elements, wherein said alloys or compounds are stoichiometric or non-stoichiometric; (d) Pre-lithiated oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites; and (e) Pre-lithiated graphene sheets; and combinations thereof.

In a sodium-ion capacitor, the anode active material contains a pre-sodiated version of petroleum coke, carbon black, amorphous carbon, activated carbon, hard carbon, soft carbon, templated carbon, hollow carbon nanowires, hollow carbon sphere, or titanate, or a sodium intercalation compound selected from $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based material, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In a sodium-ion capacitor, the anode active material contains a sodium intercalation compound selected from the following groups of materials: (a) Sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium-containing alloys or intermetallic compounds of Si, Ge, Sn, Pb, Sb, Bi, Zn, Al, Ti, Co, Ni, Mn, Cd, and their mixtures; (c) Sodium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium salts; and (e) Graphene sheets pre-loaded with sodium or potassium.

DESCRIPTION OF THE PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Figure 1A:
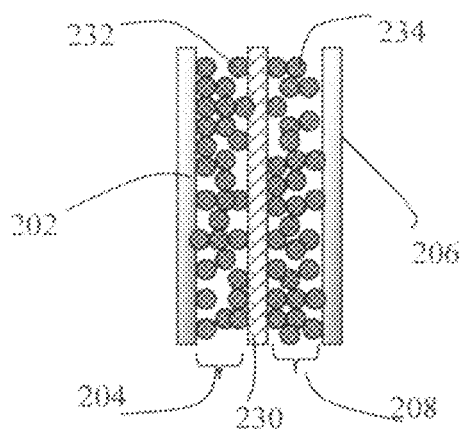
FIG. 1(A) Schematic of a prior art supercapacitor cell.

As schematically illustrated in FIG. 1(A), a prior art supercapacitor cell is typically composed of an anode current collector 202 (e.g. Al foil 12-15 μm thick), an anode active material layer 204 (containing an anode active material, such as activated carbon particles 232 and conductive additives that are bonded by a resin binder, such as PVDF) coated on the current collector, a porous separator 230, a cathode active material layer 208 (containing a cathode active material, such as activated carbon particles 234, and conductive additives that are all bonded by a resin binder, not shown), a cathode current collector 206 (e.g. Al foil), and a liquid electrolyte disposed in both the anode active material layer 204 (also simply referred to as the "anode layer") and the cathode active material layer 208 (or simply "cathode layer"). The entire cell is encased in a protective housing, such as a thin plastic-aluminum foil laminate-based envelop. The prior art supercapacitor cell is typically made by a process that includes the following steps:

a) The first step is mixing particles of the anode active material (e.g. activated carbon), a conductive filler (e.g. graphite flakes), a resin binder (e.g. PVDF) in a solvent (e.g. NMP) to form an anode slurry. On a separate basis, particles of the cathode active material (e.g. activated carbon), a conductive filler (e.g. acetylene black), a resin binder (e.g. PVDF) are mixed and dispersed in a solvent (e.g. NMP) to form a cathode slurry.

b) The second step includes coating the anode slurry onto one or both primary surfaces of an anode current collector (e.g. Cu or Al foil), drying the coated layer by vaporizing the solvent (e.g. NMP) to form a dried anode electrode coated on Cu or Al foil. Similarly, the cathode slurry is coated and dried to form a dried cathode electrode coated on Al foil.

c) The third step includes laminating an anode/Al foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure.

d) The rectangular or cylindrical laminated structure is then encased in an aluminum-plastic laminated envelope or steel casing.

e) A liquid electrolyte is then injected into the laminated structure to make a supercapacitor cell.

There are several serious problems associated with this conventional process and the resulting supercapacitor cell:

1) It is very difficult to produce an activated carbon-based electrode layer (anode layer or cathode layer) that is thicker than 100 μm and practically impossible or impractical to produce an electrode layer thicker than 200 μm. There are several reasons why this is the case:

a. An electrode of 100 μm thickness typically requires a heating zone of 30-50 meters long in a slurry coating facility, which is too time consuming, too energy intensive, and not cost-effective.

b. Thicker electrodes have a great tendency to get delaminated and cracked.

c. For some electrode active materials, such as graphene sheets, it has not been possible to produce an electrode thicker than 50 μm in a real manufacturing environment on a continuous basis. This is despite the notion that some thicker electrodes have been claimed in open or patent literature; these electrodes were prepared in a laboratory on a small scale. In a laboratory setting, presumably one could repeatedly add new materials to a layer and manually consolidate the layer to increase the thickness of an electrode. However, even with such a manual procedure (not amenable to mass production), the resulting electrode becomes very fragile and brittle.

d. This problem is even worse for graphene-based electrodes, since repeated compressions lead to re-stacking of graphene sheets and, hence, significantly reduced specific surface area and reduced specific capacitance.
2) With a conventional process, as depicted in FIG. 1(A), the actual mass loadings of the electrodes and the apparent densities for the active materials are too low. In most cases, the active material mass loadings of the electrodes (areal density) is significantly lower than 10 mg/cm$^2$ and the apparent volume density or tap density of the active material is typically less than 0.75 g/cm$^3$ (more typically less than 0.5 g/cm$^3$ and most typically less than 0.3 g/cm$^3$) even for relatively large particles of activated carbon. In addition, there are other non-active materials (e.g. conductive additive and resin binder) that add additional weights and volumes to the electrode without contributing to the cell capacity. These low areal densities and low volume densities result in relatively low volumetric capacitances and low volumetric energy density.
3) The conventional process requires dispersing electrode active materials (anode active material and cathode active material) in a liquid solvent (e.g. NMP) to make a slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte into the cell. In actuality, one makes the two electrodes wet, then makes the electrodes dry, and finally makes them wet again. Such a wet-dry-wet process does not sound like a good process at all.
4) NMP is not an environmentally friendly solvent; it is known to potentially cause birth defects.
5) Current supercapacitors (e.g. symmetric supercapacitors or electric double layer capacitors, EDLC) still suffer from a relatively low gravimetric energy density and low volumetric energy density. Commercially available EDLCs exhibit a gravimetric energy density of approximately 6 Wh/kg and no experimental EDLC cells have been reported to exhibit an energy density higher than 10 Wh/kg (based on the total cell weight) at room temperature. Although experimental supercapacitors exhibit large volumetric electrode capacitances (100 to 200 F/cm$^3$ in most cases) at the electrode level (not the cell level), their typical active mass loading of <1 mg/cm$^2$, tap density of <0.1 g/cm$^{-3}$, and electrode thicknesses of up to tens of micrometers remain significantly lower than those used in most commercially available electrochemical capacitors, resulting in energy storage devices with relatively low areal and volumetric capacities and low volumetric energy densities based on the cell (device) weight.

In literature, the energy density data reported based on either the active material weight alone or electrode weight cannot directly translate into the energy densities of a practical supercapacitor cell or device. The "overhead weight" or weights of other device components (binder, conductive additive, current collectors, separator, electrolyte, and packaging) must also be taken into account. The convention production process results in an active material proportion being less than 30% by weight of the total cell weight (<15% in some cases; e.g. for graphene-based active material).

The present invention provides a process for producing a supercapacitor cell having a high electrode thickness (thickness of the electrode that contains electrode active materials), high active material mass loading, low overhead weight and volume, high volumetric capacitance, and high volumetric energy density. In addition, the manufacturing costs of the supercapactors produced by the presently invented process are significantly lower than those by conventional processes and are much more environmentally benign.

Figure 1B:
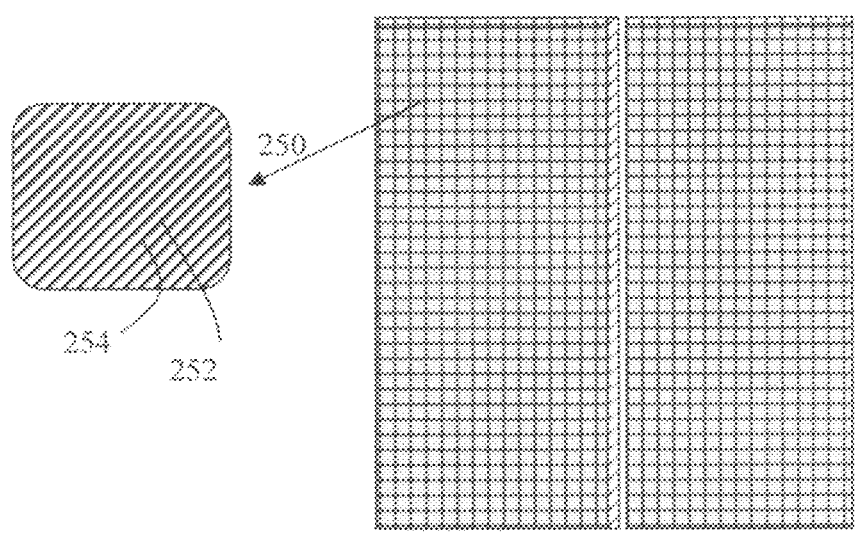
FIG. 1(B) Schematic of a presently invented supercapacitor cell, comprising a conductive porous layer (e.g. an anode current collector in the form of a highly porous foam) impregnated with a wet anode active material mixture (e.g. liquid electrolyte and an anode active material and optional conductive additive), a porous separator, and a cathode current collector in the form of a highly porous foam impregnated with a wet cathode active material mixture.

As illustrated in FIG. 1(B), the presently invented supercapacitor cell comprises a conductive porous layer (e.g. an anode current collector in the form of a highly porous foam) impregnated with a wet anode active material mixture (e.g. liquid electrolyte and an anode active material and an optional conductive additive), a porous separator, and another conductive porous layer (e.g. a cathode current collector in the form of a highly porous foam) impregnated with a wet cathode active material mixture. The pores (e.g. 250) are filled with an anode active material (e.g. graphene sheets, 252) and liquid electrolyte (254). A binder resin is not desired.

Figure 1C:
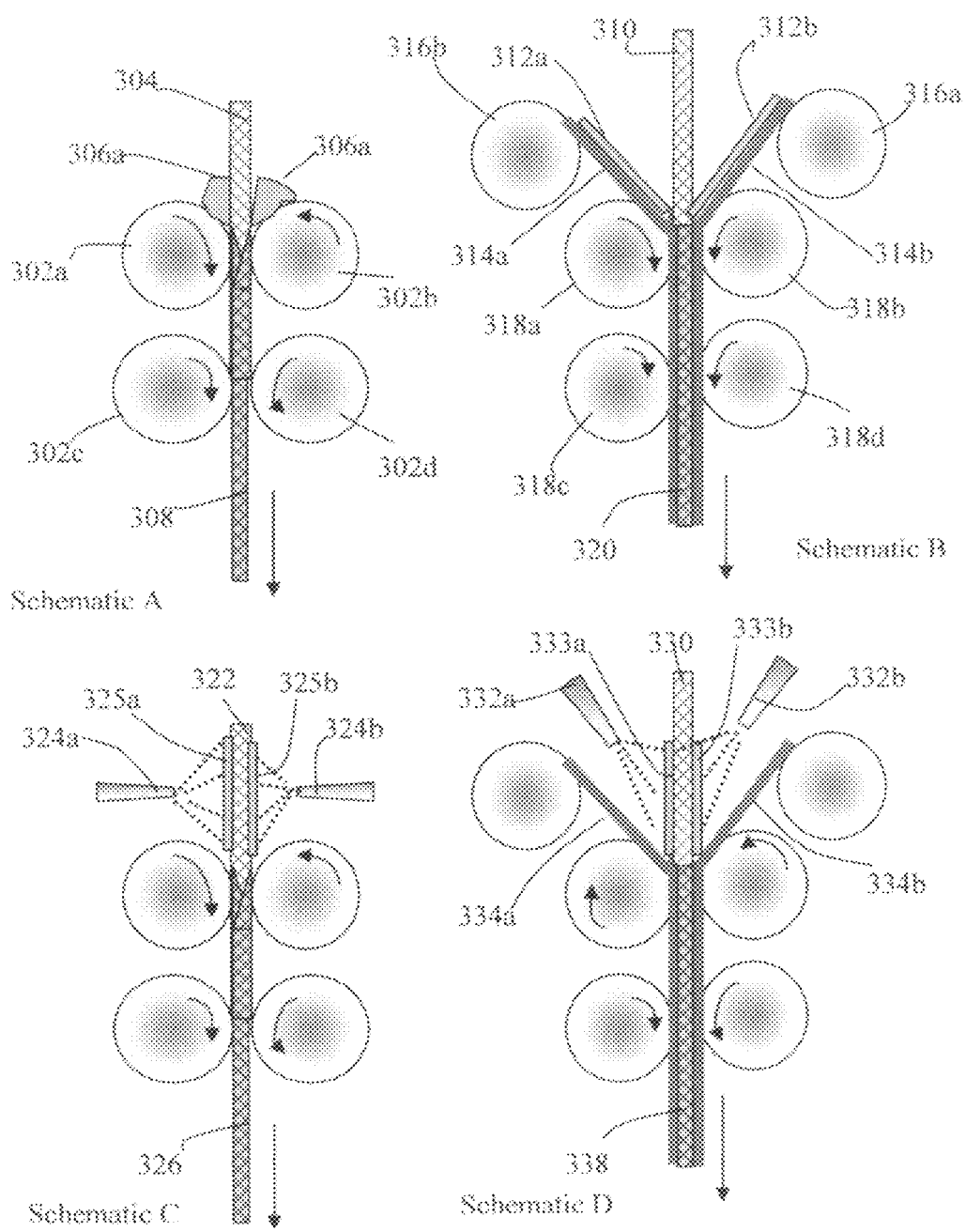
FIG. 1(C) Four examples that schematically illustrate the presently invented process for producing an electrode (anode or cathode) of a supercapacitor cell.
Figure 1D:
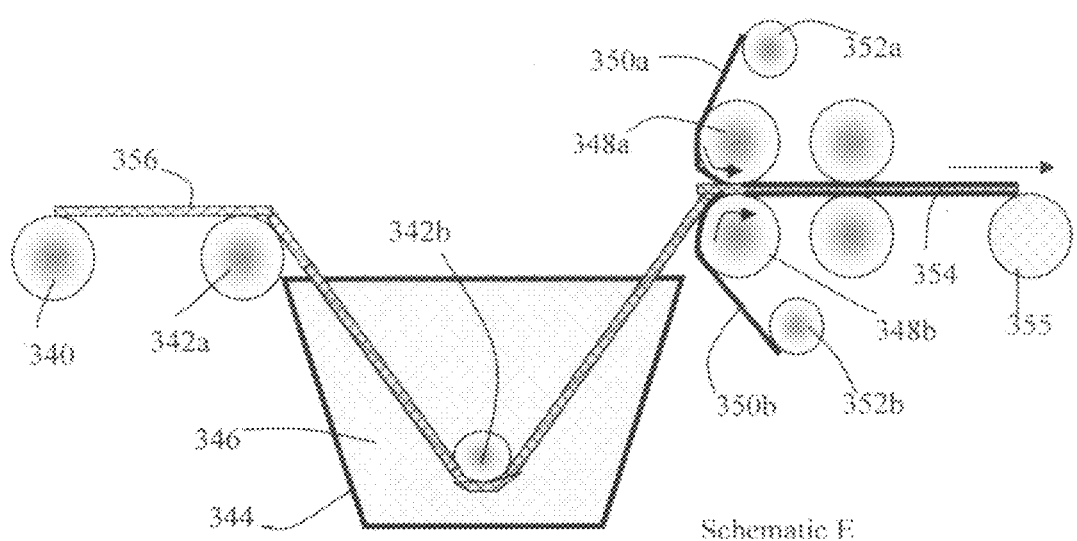
FIG. 1(D) Another example to schematically illustrate the presently invented process to produce an electrode (anode or cathode).

In one embodiment of the present invention, as illustrated in FIGS. 1(C) and 1(D), the invented process comprises continuously feeding an electrically conductive porous layer (e.g. 304, 310, 322, or 330), from a feeder roller (not shown), into an active material impregnation zone where a wet active material mixture (e.g. slurry, suspension, or gel-like mass, such as 306a, 306b, 312a, 312b) of an electrode active material (e.g. activated carbon particles and/or graphene sheets) and an optional conductive additive is delivered to at least a porous surface of the porous layer (e.g. 304 or 310 in Schematic A and Schematic B, respectively, of FIG. 1(C)). Using Schematic A as an example, the wet active material mixture (306a, 306b) is forced to impregnate into the porous layer from both sides using one or two pairs of rollers (302a, 302b, 302c, and 302d) to form an impregnated active electrode 308 (an anode or cathode). The conductive porous layer contains interconnected electron-conducting pathways and at least 70% by volume (preferably >80%, more preferably >90%) of pores.

In Schematic B, two feeder rollers 316a, 316b are used to continuously pay out two protective films 314a, 314b that support wet active material mixture layers 312a, 312b. These wet active material mixture layers 312a, 312b can be delivered to the protective (supporting) films 314a, 314b using a broad array of procedures (e.g. printing, spraying, casting, coating, etc., which are well known in the art). As the conductive porous layer 110 moves though the gaps between two sets of rollers (318a, 318b, 318c, 318d), the wet active mixture material is impregnated into the pores of the porous layer 310 to form an active material electrode 320 (an anode or cathode electrode layer) covered by two protective films 314a, 314b.

Using Schematic C as another example, two spraying devices 324a, 324b are used to dispense the wet active material mixture (325a, 325b) to the two opposed porous surfaces of the conductive porous layer 322. The wet active material mixture is forced to impregnate into the porous layer from both sides using one or two pairs of rollers to form an impregnated active electrode 326 (an anode or cathode). Similarly, in Schematic D, two spraying devices 332a, 332b are used to dispense the wet active material mixture (333a, 333b) to the two opposed porous surfaces of the conductive porous layer 330. The wet active material mixture is forced to impregnate into the porous layer from both sides using one or two pairs of rollers to form an impregnated active electrode 338 (an anode or cathode).

The resulting electrode layer (anode or cathode electrode), after consolidation, has a thickness no less than 100 µm (preferably >200 µm, further preferably >300 µm, more preferably >400 µm; further more preferably >500 µm, 600 µm, or even >1,000 µm; no theoretical limitation on this anode thickness). Consolidation may be accomplished with the application of a compressive stress (from rollers) to force the wet active material mixture ingredients to infiltrate into the pores of the conductive porous layer. The conductive porous layer is also compressed together to form a current collector that essentially extends over the thickness of the entire electrode.

Another example, as illustrated in Schematic E of FIG. 1(D), the electrode production process begins by continuously feeding a conductive porous layer 356 from a feeder roller 340. The porous layer 356 is directed by a roller 342 to get immersed into a wet active material mixture mass 346 (slurry, suspension, gel, etc.) in a container 344. The active material mixture begins to impregnate into pores of the porous layer 356 as it travels toward roller 342b and emerges from the container to feed into the gap between two rollers 348a, 348b. Two protective films 350a, 350b are concurrently fed from two respective rollers 352a, 352b to cover the impregnated porous layer 354, which may be continuously collected on a rotating drum (a winding roller 355). The process is applicable to both the anode and the cathode electrodes.

Figure 1E:
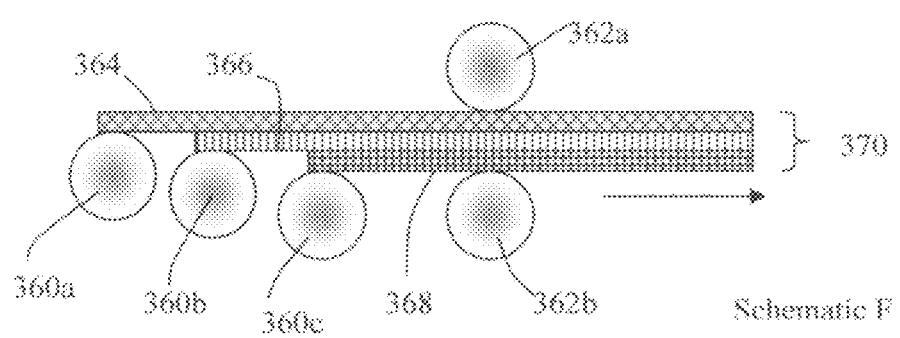
FIG. 1(E) Schematic of a presently invented process for continuously producing a supercapacitor cell by combining and laminating an anode electrode, separator, and cathode electrode (illustrated in Schematic F), and that for continuously producing a an asymmetric supercapacitor (lithium-ion capacitor or sodium-ion capacitor) laminate in an automated manner (Schematic G); the latter supercapacitor comprising an anode electrode (e.g. a porous conductive layer impregnated with graphite particles and liquid electrolyte), a porous separator, and a cathode electrode prepared by a presently invented process.
Figure 1E:
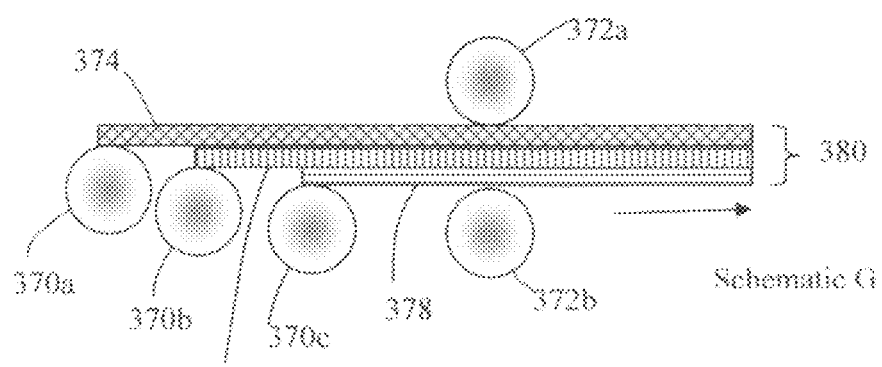
Figure 2:
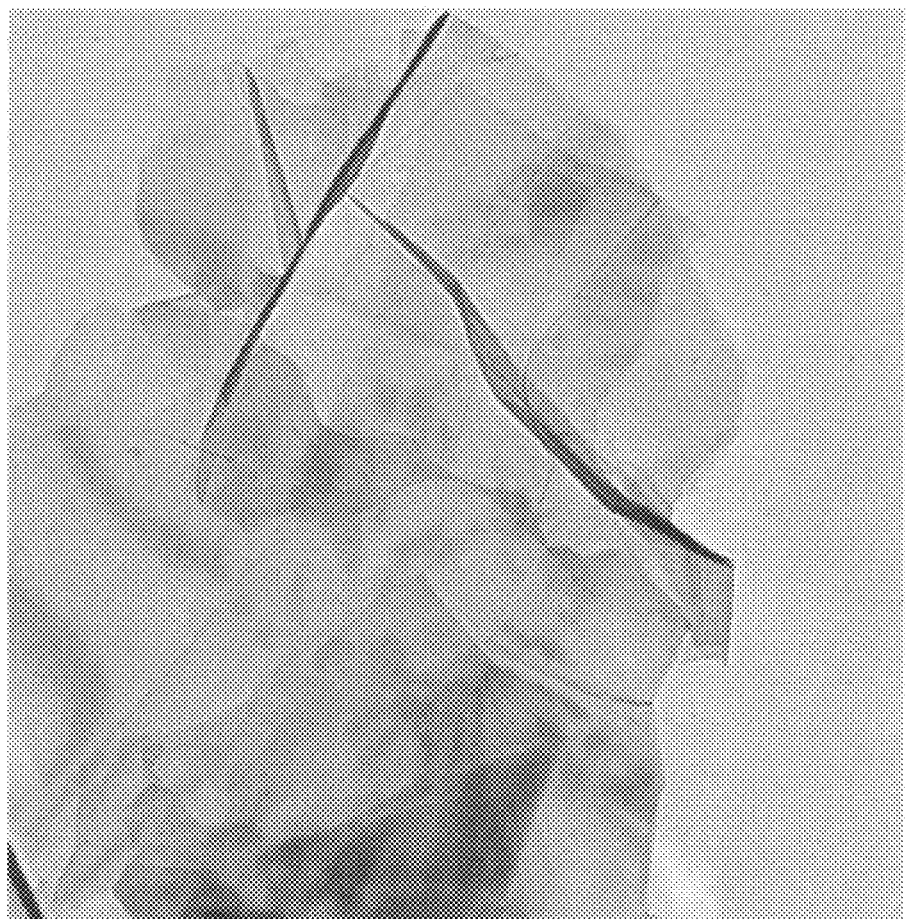
FIG. 2 An electron microscopic image of typical graphene sheets.
Figure 3A:
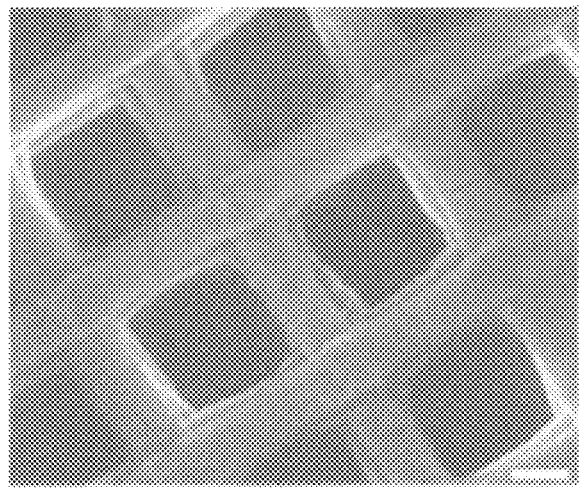
FIG. 3(A) Examples of conductive porous layers: metal grid/mesh and carbon nano-fiber mat.
Figure 3A:
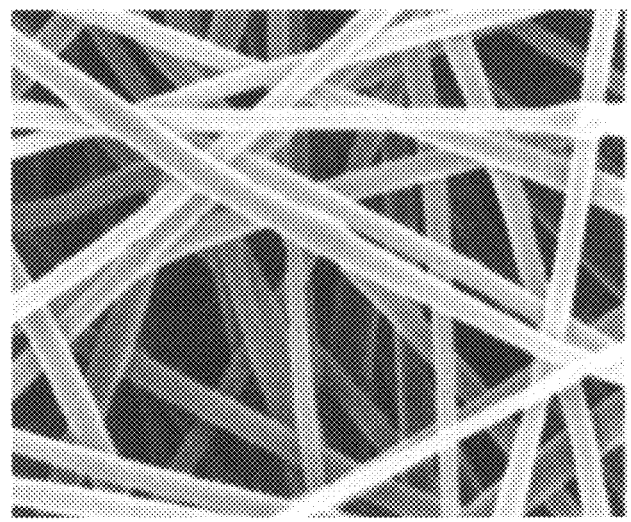
Figure 3B:
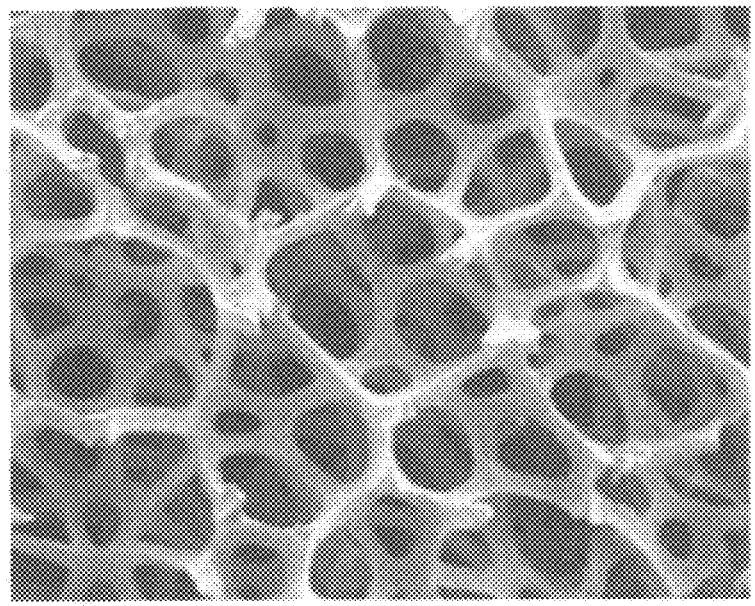
FIG. 3(B) Examples of conductive porous layers: graphene foam and carbon foam.
Figure 3B:
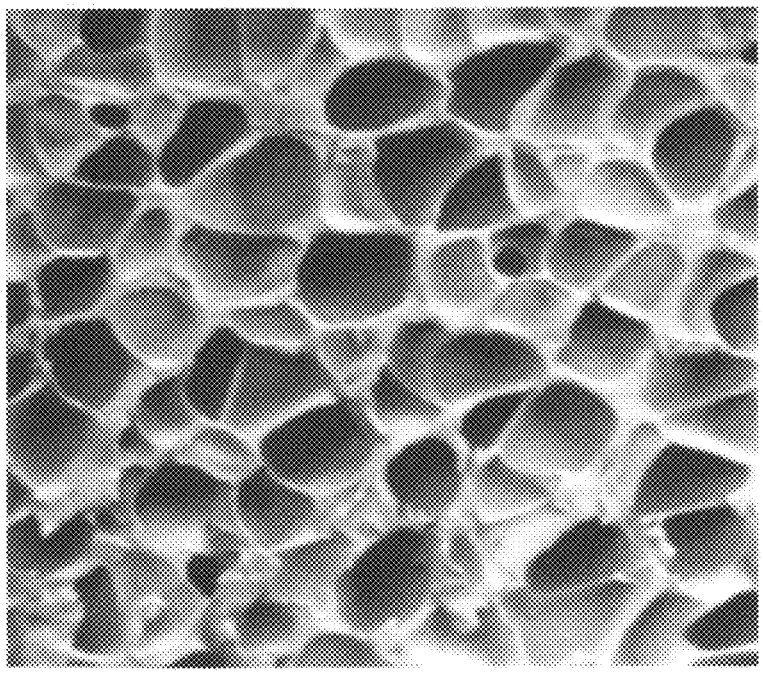
Figure 3C:
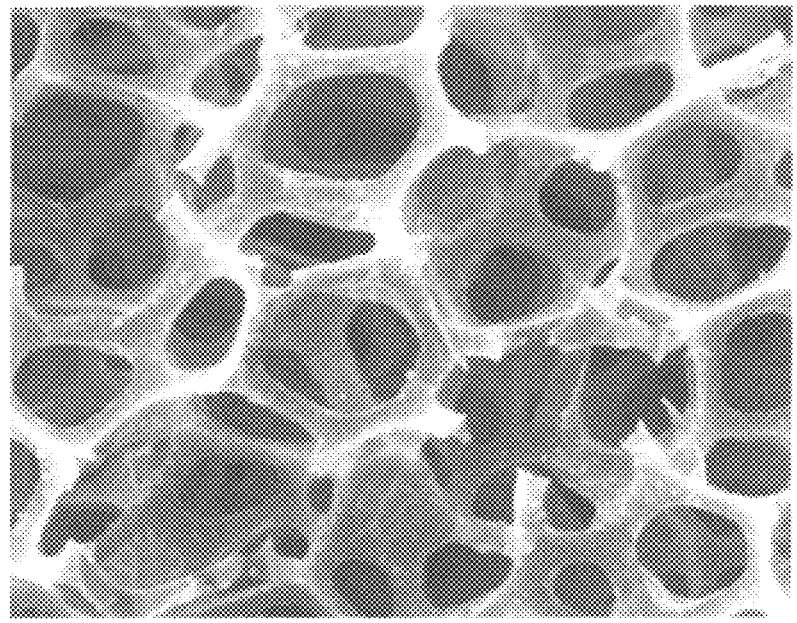
FIG. 3(C) Examples of conductive porous layers: graphite foam and Ni foam.
Figure 3C:
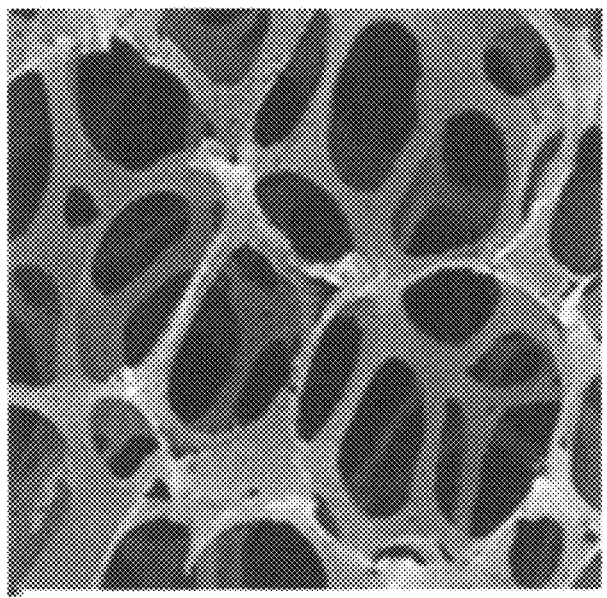
Figure 3D:
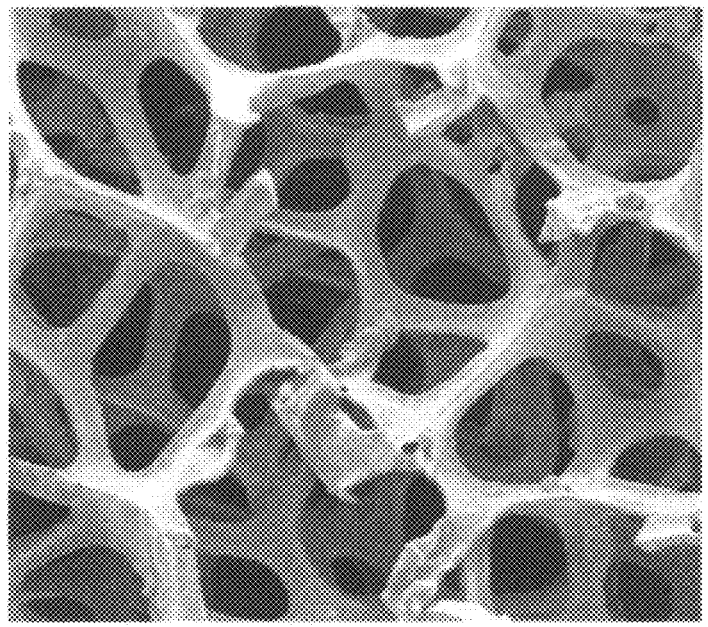
FIG. 3(D) Examples of conductive porous layers: Cu foam and stainless steel foam.
Figure 3D:
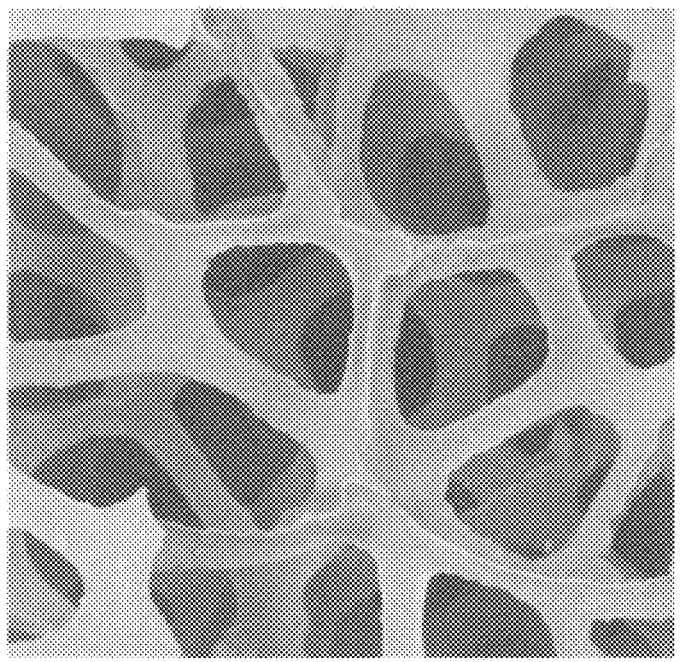

As illustrated in Schematic F of FIG. 1(E), at least one anode electrode 364 (e.g. produced by the presently invented process), a porous separator 366, and at least one cathode electrode 368 (e.g. produced by the presently invented process), may be unwound from rollers 360a, 360b, and 360c, respectively, laminated and consolidated together by moving through a pair of rollers 362a, 362b to form a supercapacitor assembly 370. Such a supercapacitor assembly 370 can be slit and cut into any desired shape and dimensions and sealed in a protective housing. It may be noted that a plurality of impregnated anode layers can be stacked and compacted into one single anode electrode to achieve a desired thickness. Similarly, a plurality of impregnated cathode layers can be stacked and compacted into one single cathode electrode.

Alternatively, as illustrated in Schematic G of FIG. 1(E), an anode electrode 378 (e.g. a Cu foil coated with Li or Na intercalation compound on two surfaces, or a conductive porous layer impregnated with particles of Li or Na intercalation compound and liquid electrolyte), a porous separator 376, and a cathode electrode 374 (e.g. produced by the presently invented process), may be unwound from rollers 370c, 370b, and 370a, respectively, laminated and consolidated together by moving through a pair of rollers 362a, 362b to form a lithium-ion capacitor (LIC) or sodium-ion capacitor (NIC) assembly 380. Such a LIC or NIC assembly 380 can be slit and cut into any desired shape and dimensions and sealed in a protective housing.

The above are but several examples to illustrate how the presently invented supercapacitor electrodes and supercapacitor cells can be made continuously, in an automated manner. These examples should not be construed as limiting the scope of the instant invention.

The first and/or second conductive porous layer has a thickness no less than 100 µm (preferably greater than 200 µm, more preferably greater than 300 µm, further preferably greater than 400 µm, and most preferably greater than 500 µm; no theoretical limit on the electrode thickness) and preferably at least 80% by volume of pores (preferably at least 85% porosity, more preferably at least 90%, and most preferably at least 95%). These porous layer structures have essentially a porosity level of 80%-99% and remaining 1%-20% being pore walls (e.g. metal or graphite skeleton). These pores are used to accommodate a mixture of active materials (e.g. graphene sheets) and liquid electrolyte, where electric double layers of charges or redox pairs are present when the supercapacitor is charged.

Preferably, substantially all of the pores in the porous layer are filled with the electrode (anode or cathode) active material and liquid electrolyte. The anode active material may be the same as or different from the cathode active material. Since there are great amounts of pores (80-99%) relative to the pore walls (1-20%), very little space is wasted ("being wasted" means not being occupied by the electrode active material and electrolyte), resulting in high amounts of electrode active material-electrolyte zones (high active material loading mass).

Schematically shown in FIG. 1(B) is an embodiment of the presently invented supercapacitor cell having large electrode thicknesses and large length; there is no limitation on the thickness or length of the cell. Both the electrically conductive porous layer in the anode (e.g. anode current collector foam) and the conductive porous layer at the cathode (e.g. cathode current collector foam) have been impregnated with their respective wet electrode active material mixtures. As an example, a pore 250, in an enlarged view, is filled with the wet anode active material mixture containing graphene sheets 252 (an example of an electrode active material) and liquid electrolyte layers 254 that are closely packed in an alternating manner. Such a tight packing enables us to achieve a high tap density (packing density) of the active material that otherwise cannot be achieved by any existing process.

In such a configuration, the charges (electrons) only have to travel a short distance (half of the pore size, on average; e.g. a few micrometers) before they are collected by the current collector (pore walls). Additionally, in each wet electrode active material mixture, graphene sheets are dispersed in a liquid electrolyte (i.e. each graphene sheet is surrounded by liquid electrolyte). Upon impregnation into the pores of the porous layers (as the anode or cathode current collector), the slurry (wet mixture) remains in a dispersion or suspension state, in which individual graphene sheets remain surrounded by the liquid electrolyte, totally eliminating the possibility of graphene sheets being fully re-stacked that otherwise would result in the specific surface area being significantly reduced. Thus, the presently invented process produces a totally unexpected advantage over the conventional supercapacitor cell production process.

In a preferred embodiment, the graphene electrode material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

The present invention also provides a lithium-ion capacitor (LIC) or a sodium-ion capacitor (NIC), wherein at least one of the two electrodes is produced by the presently invented process. More preferably, both the anode electrode and the cathode electrode for the presently invented LIC or NIC are made by the presently invented process described above. This inventive process includes (A) Continuously feeding a second electrically conductive porous layer to an anode material impregnation zone, wherein the second conductive porous layer has two opposed porous surfaces and contain interconnected electron-conducting pathways and, preferably, at least 70% by volume of pores; and (B) Impregnating a wet anode active material mixture into the second electrically conductive porous layer from at least one of the two porous surfaces to form an electrode. For instance, the wet anode active material mixture contains a liquid electrolyte and an anode active material preferably selected from prelithiated or pre-sodiated versions of graphite particles, carbon particles, Si nano particles, Sn nano particles, or any other commonly used anode active materials for lithium-ion batteries or sodium-ion batteries. These anode active materials can be made into a fine particle form and multiple particles, along with conductive additive particles, can be readily mixed with a liquid electrolyte to form a wet anode active material mixture (e.g. in a slurry form) for impregnation into a conductive porous layer.

In a lithium-ion capacitor (LIC), the anode active material may be selected from the group consisting of: (a) Pre-lithiated particles of natural graphite, artificial graphite, meso-carbon microbeads (MCMB), and carbon; (b) Pre-lithiated particles or coating of Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (c) Pre-lithiated alloys or intermetallic compounds of Si, Ge, Sn, Pb, Sb, Bi, Zn, Al, or Cd with other elements, wherein said alloys or compounds are stoichiometric or non-stoichiometric; (d) Pre-lithiated oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites; and (e) Pre-lithiated graphene sheets; and combinations thereof. Pre-lithiation can be accomplished electrochemically by using a compact mass of graphene sheets as the working electrode and lithium metal as the counter electrode. Pre-lithiation may also be accomplished by adding lithium powder or chips along with the anode active material (e.g. Si particles) and conductive additive particles into a liquid electrolyte.

In a sodium-ion capacitor, the anode active material contains a pre-sodiated version of petroleum coke, carbon black, amorphous carbon, activated carbon, hard carbon, soft carbon, templated carbon, hollow carbon nanowires, hollow carbon sphere, or titanate, or a sodium intercalation compound selected from $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based material, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In a sodium-ion capacitor, the anode active material contains a sodium intercalation compound selected from the following groups of materials: (a) Sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium-containing alloys or intermetallic compounds of Si, Ge, Sn, Pb, Sb, Bi, Zn, Al, Ti, Co, Ni, Mn, Cd, and their mixtures; (c) Sodium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium salts; and (e) Graphene sheets pre-loaded with sodium or potassium. Pre-sodiation can be accomplished electrochemically by using a compact mass of graphene sheets as the working electrode and sodium metal as the counter electrode. Pre-sodiation may also be accomplished by adding lithium powder or chips along with the anode active material (e.g. Sn particles) and conductive additive particles into a liquid electrolyte.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent Application Ser. No. 11/509,424 (Aug. 25, 2006).

Figure 4A:
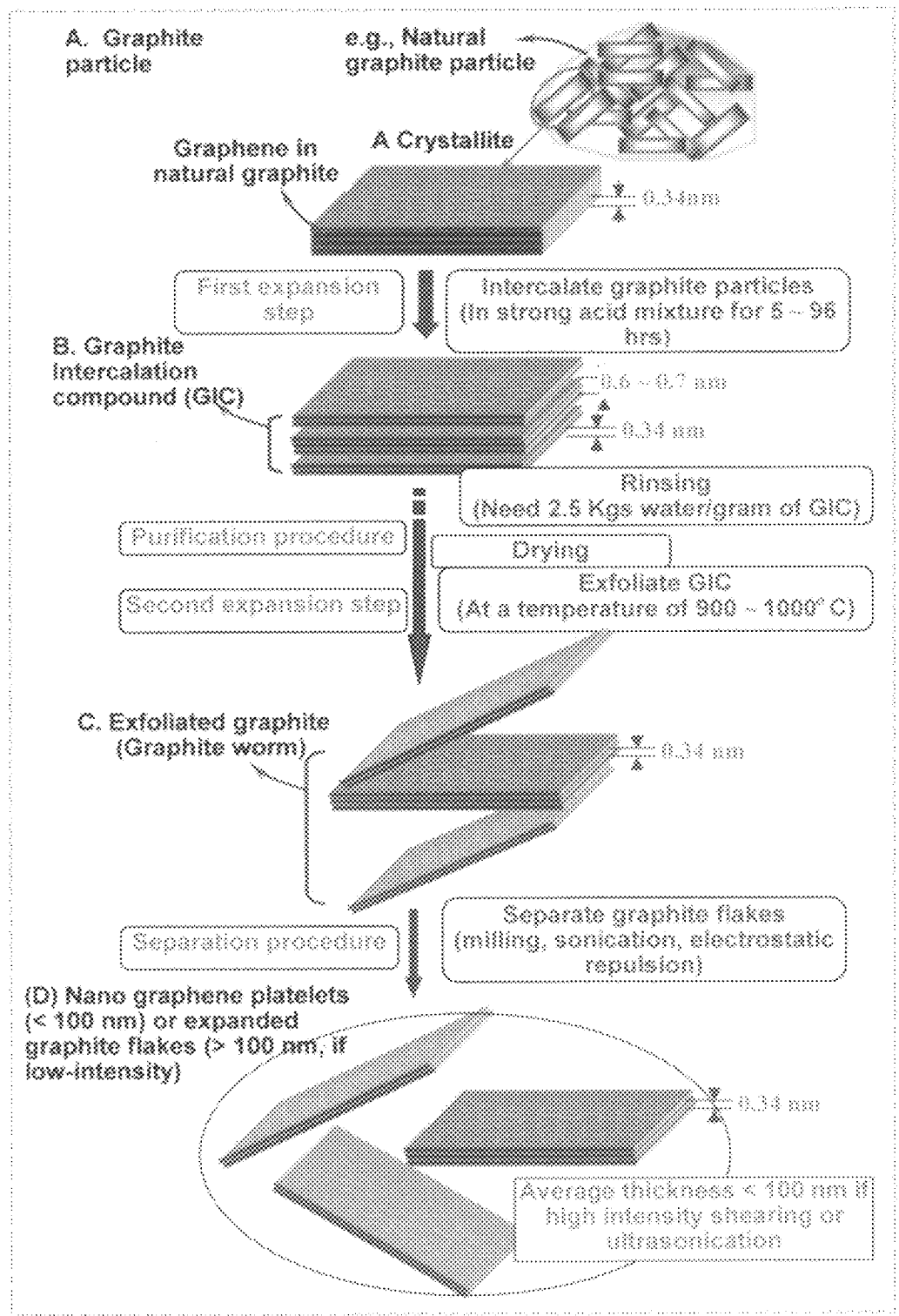
FIG. 4(A) Schematic of a commonly used process for producing exfoliated graphite, expanded graphite flakes (thickness >100 nm), and graphene sheets (thickness <100 nm, more typically <10 nm, and can be as thin as 0.34 nm).
Figure 4:
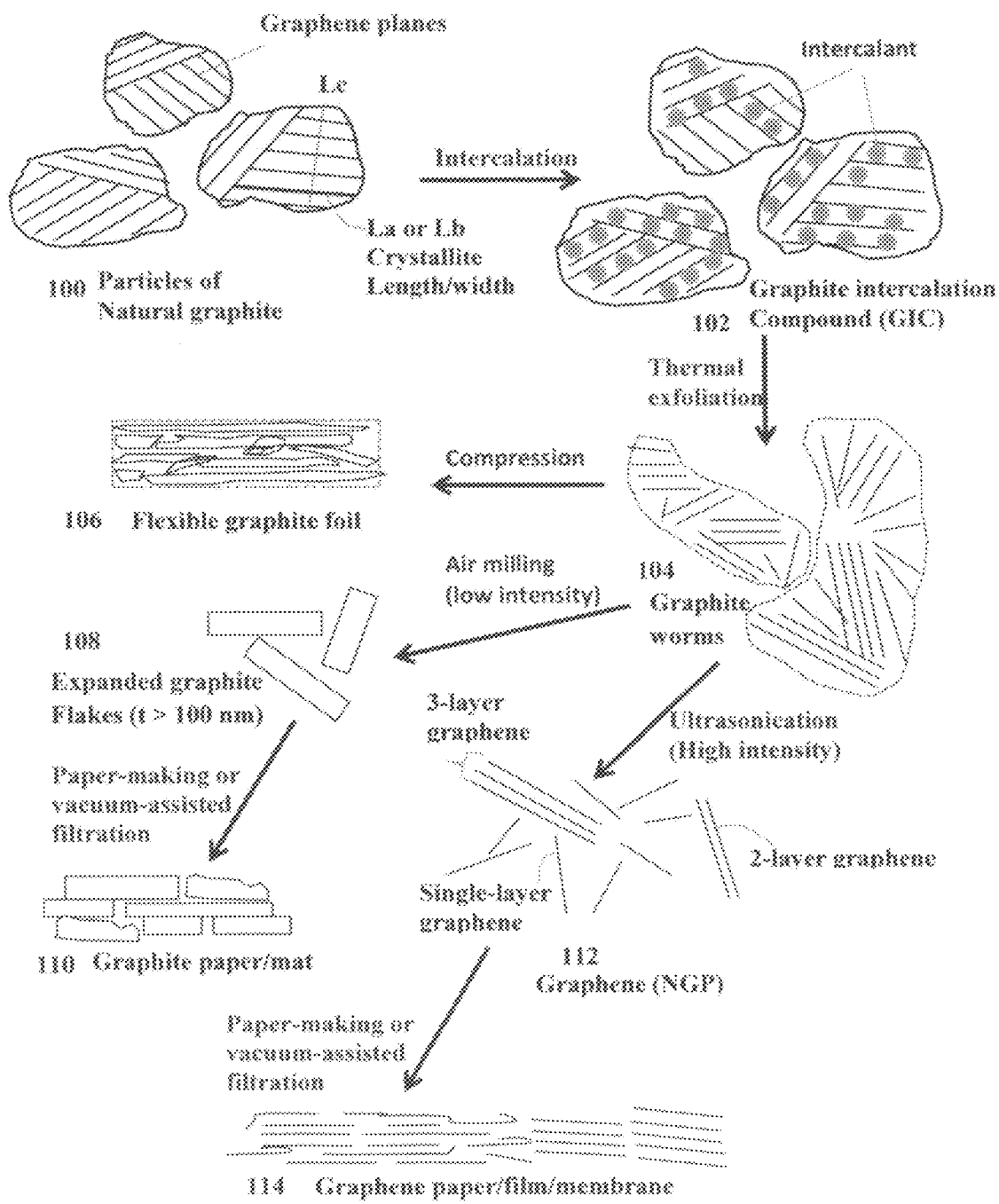
FIG. 4(B) Schematic drawing to illustrate the processes for producing exfoliated graphite, expanded graphite flakes, and graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 4(A) and FIG. 4(B) (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 4(B)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation bas been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ (2≤x≤24) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules.

The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 4(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 4(B), different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 4(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications.

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Exfoliated graphite worms may be subjected to high-intensity mechanical shearing/separation treatments using a high-intensity air jet mill, high-intensity ball mill, or ultra-sonic device to produce separated nano graphene platelets (NGPs) with all the graphene platelets thinner than 100 nm, mostly thinner than 10 nm, and, in many cases, being single-layer graphene (also illustrated as 112 in FIG. 4(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide may be made into a graphene film/paper (114 in FIG. 4(B)) using a film- or paper-making process. Alternatively, with a low-intensity shearing, graphite worms tend to be separated into the so-called expanded graphite flakes (108 in FIG. 4(B) having a thickness >100 nm. These flakes can be formed into graphite paper or mat 106 using a paper- or mat-making process, with or without a resin binder.

Despite the fact that individual graphene sheets have an exceptionally high specific surface area, graphene sheets have a great tendency to re-stack together or to overlap with one another, thereby dramatically reducing the specific capacitance due to the significantly reduced specific surface area that is accessible by the electrolyte. This tendency to re-stack is particularly acute during the supercapacitor cell electrode production process. In this process, graphene sheets, along with other conductive additive and resin binder (e.g. PVDF), are dispersed in a solvent (typically NMP) to form a slurry, which is then coated on a surface of a solid current collector (e.g. Al foil). The solvent is then removed (vaporized) to form a dried layer of active material electrode, which is then fed through a pair of rollers in a compression machine to consolidate the electrode layer. These drying and compressing procedures induce severe graphene re-stacking. In many of the scientific reports, even though the graphene sheets in an original powder form were found to exhibit an exceptionally high specific surface area, the resulting electrode only shows an unexpectedly lower specific capacitance. Theoretically, the maximum specific capacitance of a single-layer graphene-based supercapacitor is as high as 550 F/g (based on an EDLC structure, no redox pair or pseudo-capacitance), but experimentally achieved values have been in the range of mere 90-170 F/g. This has been a long-standing problem in the art of supercapacitors.

The present invention provides a highly innovative and elegant process to overcome this graphene sheet re-stacking issue. This invented process completely eliminates the need to go through slurry coating, drying, and compressing procedures. Instead of forming a slurry containing an environmentally undesirable solvent (i.e. NMP), the process entails dispersing graphene sheets in a liquid electrolyte to form a slurry of electrode active material-liquid electrolyte mixture. This mixture slurry is then injected into pores of a conductive foam-based current collector; no subsequent drying and compressing are required and no or little possibility of graphene sheets re-stacking together. Furthermore, graphene sheets are already pre-dispersed in a liquid electrolyte, implying that essentially all graphene surfaces are naturally accessible to the electrolyte, leaving behind no "dry pockets". This process also enables us to pack graphene sheets (with electrolyte in between) in a highly compact manner, giving rise to an unexpectedly high electrode active material tap density.

The graphene sheets used in the aforementioned process may be subjected to the following treatments, separately or in combination:
(a) Being chemically functionalized or doped with atomic, ionic, or molecular species. Useful surface functional groups may include quinone, hydroquinone, quaternized aromatic amines, mercaptans, or disulfides. This class of functional groups can impart pseudo-capacitance to graphene-based supercapacitors.
(b) coated or grafted with an intrinsically conductive polymer (conducting polymers, such as polyacetylene, polypyrrole, polyaniline, polythiophene, and their derivatives, are good choices for use in the present invention); These treatments are intended for further increasing the capacitance value through pseudo-capacitance effects such as redox reactions.
(c) deposition with transition metal oxides or sulfides, such as $RuO_2$, $TiO_2$, $MnO_2$, $Cr_2O_3$, and $Co_2O_3$, for the purpose of forming redox pairs with graphene sheets, thereby imparting pseudo-capacitance to the electrode; and
(d) subjected to an activation treatment (analogous to activation of carbon black materials) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

We have discovered that a wide variety of two-dimensional (2D) inorganic materials can be used in the presented invented supercapacitors prepared by the invented direct active material-electrolyte injection process. Layered materials represent a diverse source of 2D systems that can exhibit unexpected electronic properties and high specific surface areas that are important for Supercapacitor applications. Although graphite is the best known layered material, transition metal dichalcogenides (TMDs), transition metal oxides (TMOs), and a broad array of other compounds, such as BN, $Bi_2Te_3$, and $Bi_2Se_3$, are also potential sources of 2D materials.

Non-graphene 2D nano materials, single-layer or few-layer (up to 20 layers), can be produced by several methods: mechanical cleavage, laser ablation (e.g. using laser pulses to ablate TMDs down to a single layer), liquid phase exfoliation, and synthesis by thin film techniques, such as PVD (e.g. sputtering), evaporation, vapor phase epitaxy, liquid phase epitaxy, chemical vapor epitaxy, molecular beam epitaxy (MBE), atomic layer epitaxy (ALE), and their plasma-assisted versions.

We have surprisingly discovered that most of these inorganic materials, when in a 2D nano-disc, nano-platelet, nano-belt, or nano-ribbon form, exhibit remarkable EDLC values, even though these inorganic materials are normally considered as electrically non-conducting and, hence, not a candidate supercapacitor electrode material. The supercapacitance values are exceptionally high when these 2D nano materials are used in combination with a small amount of nano graphene sheets (particularly single-layer graphene). The required single-layer graphene can be from 0.1% to 50% by weight, more preferably from 0.5% to 25%, and most preferably from 1% to 15% by weight.

In the instant invention, there is no limitation on the type of liquid electrolytes that can be used in the supercapacitor: aqueous, organic, gel, and ionic liquid. Typically, electrolytes for supercapacitors consist of solvent and dissolved chemicals (e.g. salts) that dissociate into positive ions (cations) and negative ions (anions), making the electrolyte electrically conductive. The more ions the electrolyte contains, the better its conductivity, which also influences the capacitance. In supercapacitors, the electrolyte provides the molecules for the separating monolayer in the Helmholtz double-layer (electric double layer) and delivers the ions for pseudocapacitance.

Water is a relatively good solvent for dissolving inorganic chemicals. When added together with acids such as sulfuric acid ($H_2SO_4$), alkalis such as potassium hydroxide (KOH), or salts such as quaternary phosphonium salts, sodium perchlorate ($NaClO_4$), lithium perchlorate ($LiClO_4$) or lithium hexafluoride arsenate ($LiAsF_6$), water offers relatively high conductivity values. Aqueous electrolytes have a dissociation voltage of 1.15 V per electrode and a relatively low operating temperature range. Water electrolyte-based supercapacitors exhibit low energy density.

Alternatively, electrolytes may contain organic solvents, such as acetonitrile, propylene carbonate, tetrahydrofuran, diethyl carbonate, γ-butyrolactone, and solutes with quaternary ammonium salts or alkyl ammonium salts such as tetraethylammonium tetrafluoroborate ($N(Et)_4BF_4$) or triethyl (metyl) tetrafluoroborate ($NMe(Et)_3BF_4$). Organic electrolytes are more expensive than aqueous electrolytes, but they have a higher dissociation voltage of typically 1.35 V per electrode (2.7 V capacitor voltage), and a higher temperature range. The lower electrical conductivity of organic solvents (10 to 60 mS/cm) leads to a lower power density, but a higher energy density since the energy density is proportional to the square of the voltage.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

In order to make a pseudo-capacitor (a aupercapacitor that works on the development of pseudo-capacitance through redox pair formation), the anode active material or cathode active material may be designed to contain graphene sheets and a redox pair partner material selected from a metal oxide, a conducting polymer, an organic material, a non-graphene carbon material, an inorganic material, or a combination thereof. Many of the materials that can pair up with reduced graphene oxide sheets are well-known in the art. In this study, we have come to realize that graphene halogenide (e.g. graphene fluoride), graphene hydrogenide, and nitrogenated graphene can work with a wide variety of partner materials to form a redox pair for developing pseudo-capacitance.

For instance, the metal oxide or inorganic materials that serve in such a role include $RuO_2$, $IrO_2$, $NiO$, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, $MoC_x$, $Mo_2N$, or a combination thereof. In general, the inorganic material may be selected from a metal carbide, metal nitride, metal boride, metal dichalcogenide, or a combination thereof. Preferably, the desired metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. These materials can be in the form of a simple mixture with sheets of a graphene material, but preferably in a nano particle or nano coating form that that is physically or chemically bonded to a surface of the graphene sheets prior to being formed into a wet active material mixture (e.g. in a slurry form) and impregnated into the pores of the conductive porous layers.

In what follows, we provide some examples of several different types of graphene materials, other types of electrode active materials (e.g. activated carbon and select inorganic materials), redox pair partner materials, and porous current collector materials (e.g. graphite foam, graphene foam, and metal foam) to illustrate the best mode of practicing the instant invention. Theses illustrative examples and other portions of instant specification and drawings, separately or in combinations, are more than adequate to enable a person of ordinary skill in the art to practice the instant invention. However, these examples should not be construed as limiting the scope of instant invention.

EXAMPLE 1

Graphene from Carbon/Graphite Fibers

Continuous graphite fiber yarns were cut into segments of 5 mm long and then ball-milled for 48 hours. Approximately 20 grams of these milled fibers were immersed in a mixture of 2 L of formic acid and 0.1 L of hydrogen peroxide at 45° C. for 60 hours. Following the chemical oxidation intercalation treatment, the resulting intercalated fibers were washed with water and dried. The resulting product is a formic acid-intercalated graphite fiber material containing graphite oxide crystallites.

Subsequently, approximately ½ of the intercalated or oxidized fiber sample was transferred to a furnace pre-set at a temperature of 1,000° C. for 30 seconds. The compound was found to induce extremely rapid and high expansions of graphite crystallites. Approximately half of the as-exfoliated graphite fibers were subjected to de-oxygenation at 1,100° C. for 20 minutes in a nitrogen atmosphere to obtain reduced exfoliated graphite. A small amount each of the two materials was separately mixed with an aqueous ethanol solution to form two separate suspensions, which were subjected to further separation of exfoliated flakes using an ultrasonicator. Both graphite oxide platelets and reduced GO platelets (RGO) were found to be well-dispersed in the aqueous solution.

Two separate processes were conducted to prepare supercapacitor cells featuring GO, reduced graphene oxide sheets (RGO), and RGO-carbon mixtures as electrode active materials. One process is conducted according to the presently invented direct injection of active material-electrolyte mixture slurry into pores of foamed current collectors. For comparison, the other process is the conventional one that includes the steps of electrode coating on solid current collectors and drying, lamination of coated current collectors and a separator disposed between the two current collectors, encasing of the laminated structure, and injection of liquid electrolyte into the encased cell.

In one series of samples, activated carbon (AC) particles and multi-walled carbon nanotubes (CNT) were separately added into the GO and RGO suspensions, respectively, with an AC-to-GO ratio of 5/95 and CNT-to-RGO ratio of 10/90. The resulting suspension was then impregnated into the pores of foamed current collectors (Ni foam) having a 95% porosity. Supercapacitor cells containing pure GO or NGP alone as the electrode active material were also made.

In the present study, electrode active materials were also chosen based on graphene sheets in combination with an inorganic material, which includes nano discs, nano platelets, or nano sheets of an inorganic material selected from: (a) bismuth selenide, (b) transition metal dichalcogenide, (c) sulfide or selenide of zirconium, molybdenum, titanium, cobalt, manganese, iron, and nickel; and (d) boron nitride.

EXAMPLE 2

Preparation of Graphene Oxide (GO) and Reduced Graphene Oxide (RGO) Nano Sheets from Natural Graphite Powder Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 μL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

After chemical reduction of GO to become RGO, the dried ROG powder was dispersed in an organic electrolyte (acetonitrile+$N(Et)_4BF_4$) to form an organic RGO slurry. GO powder was separately dispersed in sulfuric acid-based electrolyte to form an aqueous GO slurry. The two slurries were separately impregnated into two separate sets of conductive porous layers (Ni foam) to produce two separate EDLC supercapacitor cells.

For comparison purposes, conventional slurry coating and drying procedures were conducted to produce conventional electrodes. Electrodes and a separator disposed between two electrodes were then assembled and encased in an Al-plastic laminated packaging envelop, followed by liquid electrolyte injection to form a supercapacitor cell.

EXAMPLE 3

Preparation of Single-Layer Graphene Sheets from Meso-Carbon Micro-Beads (MCMBs)

Meso-carbon microbeads (MCMBs) were supplied from China Steel Chemical Co., Kaohsiung, Taiwan. This material has a density of about 2.24 $g/cm^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water and then dried to produce GP powder. The GO powder was then thermally reduced at 200-700° C. for varying periods of time to produce samples of reduced graphene oxide (RGO) powder having an oxygen content of approximately from 1% to 20%. These RGOs were used directly as an EDLC-type supercapacitor electrode material or join a partner material (e.g. metal oxide, conducting polymer, etc., bonded to RGO surface) to form a redox pair in a psedo-capacitance based superapacitor. Both the presently invented process and conventional process were used to produce supercapacitot cells, which were compared

EXAMPLE 4

Preparation of Pristine Graphene Sheets (0% Oxygen) as a Supercapacitor Electrode Active Material Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements. Pristine graphene sheets were then incorporated in a supercapacitor using both the presently invented procedure of slurry injection into foam pores and conventional procedure of slurry coating, drying and layer laminating. Both EDLC and pseudo-capacitance types (redox pair with polyaniline or $MnO_2$) of supercapacitors were investigated.

EXAMPLE 5

CVD Graphene Foam-Based Current Collectors on Ni Foam Templates

The procedure for producing CVD graphene foam was adapted from that disclosed in open literature: Chen, Z. et al. "Three-dimensional flexible and conductive interconnected graphene networks grown by chemical vapor deposition," Nat. Mater. 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. Four types of foams made in this example were used as a current collector in the presently invented supercapacitors: Ni foam, CVD graphene-coated Ni form, CVD graphene foam (Ni being etched away), and conductive polymer bonded CVD graphene foam.

In order to recover (separate) graphene foam, Ni frame was etched away. In the procedure proposed by Chen, et al., before etching away the nickel skeleton by a hot HCl (or $FeCl_3$) solution, a thin layer of poly(methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer was considered critical to preparing a free-standing film of graphene foam. Instead, we used a conducting polymer as a binder resin to hold graphene together while Ni was etched away. It may be noted that the CVD graphene foam used herein is intended as a foamed current collector to accommodate the carbon particles or graphene sheets injected along with a liquid electrolyte. But, we have surprisingly found that such a graphene foam, with or without a conductive polymer, is itself a supercapacitor electrode material. Such a combination enables a maximized amount of active materials incorporated in a supercapacitor cell.

EXAMPLE 6

Graphitic Foam-Based Current Collectors from Pitch-Based Carbon Foams

Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

EXAMPLE 7

Preparation of Graphene Fluoride Sheets as a Supercapacitor Active Material

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish powder.

EXAMPLE 8

Preparation of Nitrogenataed Graphene Sheets as a Supercapacitor Electrode Active Material Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenataed graphene sheets remain dispersible in water. The resulting suspensions were then dried to obtain nitrogenated graphene powder. The powder was mixed in a liquid electrolyte to form a slurry for impregnation into pores of conductive porous layers.

EXAMPLE 9

Preparation of $MoS_2$/RGO Hybrid Material as a Supercapacitor Active Material

A wide variety of inorganic materials were investigated in this example. For instance, an ultra-thin $MoS_2$/RGO hybrid was synthesized by a one-step solvothermal reaction of $(NH_4)_2MoS_4$ and hydrazine in an N, N-dimethylformamide (DMF) solution of oxidized graphene oxide (GO) at 200° C. In a typical procedure, 22 mg of $(NH_4)_2MoS_4$ was added to 10 mg of GO dispersed in 10 ml of DMF. The mixture was sonicated at room temperature for approximately 10 min until a clear and homogeneous solution was obtained. After that, 0.1 ml of $N_2H_4 \cdot H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, product was dried and made into an electrode. On a separate basis, several different amounts (5% to 45% by weight) of $MoS_2$ platelets were combined with activated carbon particles form a composite electrode for making a supercapacitor.

EXAMPLE 10

Preparation of Two-Dimensional (2D) Layered $Bi_2Se_3$ Chalcogenide Nanoribbons The preparation of (2D) layered $Bi_2Se_3$ chalcogenide nanoribbons is well-known in the art. For instance, $Bi_2Se_3$ nanoribbons were grown using the vapor-liquid-solid (VLS) method. Nanoribbons herein produced are, on average, 30-55 nm thick with widths and lengths ranging from hundreds of nanometers to several micrometers. Larger nanoribbons were subjected to ball-milling for reducing the lateral dimensions (length and width) to below 200 nm. Nanoribbons prepared by these procedures (with or without the presence of graphene sheets or exfoliated graphite flakes) were used as a supercapacitor electrode active material.

EXAMPLE 11

MXenes Powder+Chemically Activated RGO

Selected MXenes, were produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (O, OH, and/or F), n=1, 2, or 3, and x is the number of terminating groups. The MXene materials investigated include $Ti_2CT_x$, $Nb_2CT_x$, $V_2CT_x$, $Ti_3CNT_x$, and $Ta_4C_3T_x$. Typically, 35-95% MXene and 5-65% graphene sheets were mixed in a liquid electrolyte and impregnated into pores of conductive porous layers.

EXAMPLE 12

Preparation of $MnO_2$—Graphene Redox Pairs

The $MnO_2$ powder was synthesized by two methods (each with or without the presence of graphene sheets). In one method, a 0.1 mol/L $KMnO_4$ aqueous solution was prepared by dissolving potassium permanganate in deionized water. Meanwhile 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L $KMnO_4$ solution and selected amounts of GO solution were added in the solution, which was ultrasonicated for 30 min to prepare a dark brown precipitate. The product was separated, washed several times with distilled water and ethanol, and dried at 80° C. for 12 h. The sample is graphene-supported $MnO_2$ in a powder form, which was dispersed in a liquid electrolyte to form a slurry and impregnated into pores of a foamed current collector.

EXAMPLE 13

Evaluation of Various Supercapacitor Cells

In most of the examples investigated, both the inventive supercapacitor cells and their conventional counterparts were fabricated and evaluated. The latter cells, for comparison purposes, were prepared by the conventional procedures of slurry coating of electrodes, drying of electrodes, assembling of anode layer, separator, and cathode layer, packaging of assembled laminate, and injection of liquid electrolyte. In a conventional cell, an electrode (cathode or anode), is typically composed of 85% an electrode active material (e.g. graphene, activated carbon, inorganic nano discs, etc.), 5% Super-P (acetylene black-based conductive additive), and 10% PTFE, which were mixed and coated on Al foil. The thickness of electrode is around 100 μm. For each sample, both coin-size and pouch cells were assembled in a glove box. The capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

Galvanostatic charge/discharge tests were conducted on the samples to evaluate the electrochemical performance. For the galvanostatic tests, the specific capacity (q) is calculated as $$q = I*t/m \qquad (1)$$

where I is the constant current in mA, t is the time in hours, and m is the cathode active material mass in grams. With voltage V, the specific energy (E) is calculated as, $$E = \int V dq \qquad (2)$$

The specific power (P) can be calculated as $$P = (E/t) \; (W/kg) \qquad (3)$$

where t is the total charge or discharge step time in hours.

The specific capacitance (C) of the cell is represented by the slope at each point of the voltage vs. specific capacity plot, $$C = dq/dV \qquad (4)$$

For each sample, several current density (representing charge/discharge rates) were imposed to determine the electrochemical responses, allowing for calculations of energy density and power density values required of the construction of a Ragone plot (power density vs. energy density).

Figure 5:
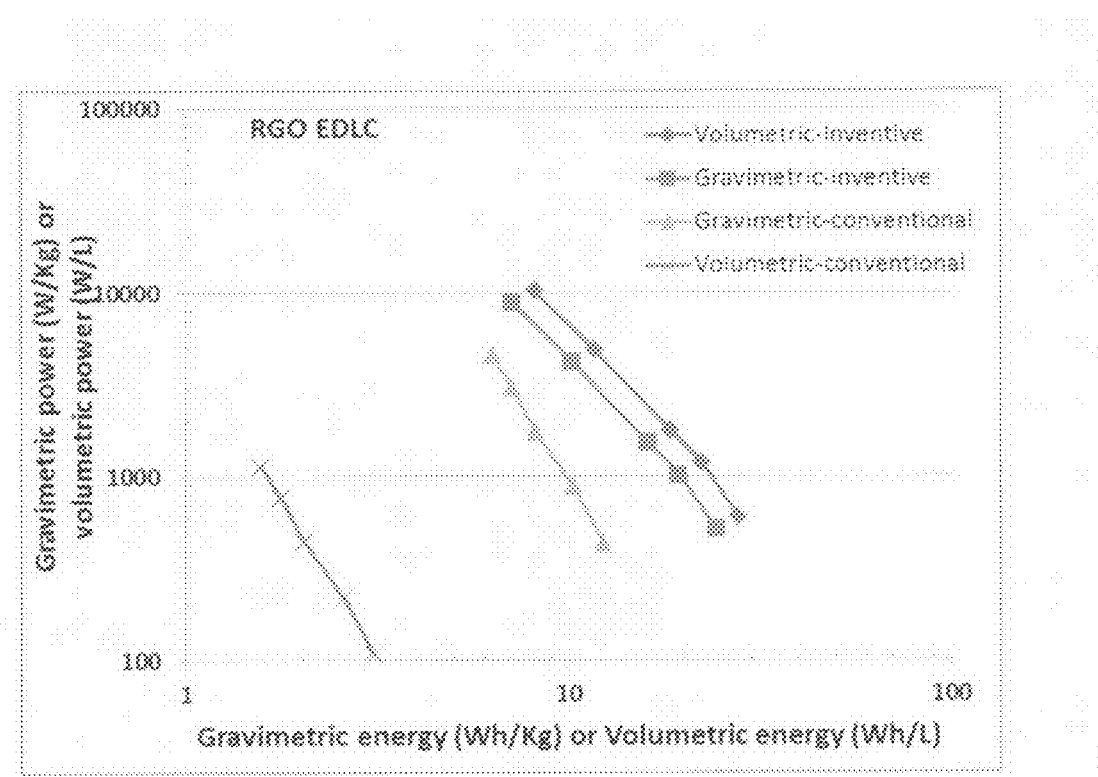
FIG. 5 Ragone plots (gravimetric and volumetric power density vs. energy density) of symmetric supercapacitor (EDLC) cells containing reduced graphene oxide (RGO) sheets as the electrode active material and EMIMBF4 ionic liquid electrolyte. Supercapacitors were prepared according to an embodiment of instant invention and, for comparison, by the conventional slurry coating of electrodes.

Shown in FIG. 5 are Ragone plots (gravimetric and volumetric power density vs. energy density) of two sets of symmetric supercapacitor (EDLC) cells containing reduced graphene oxide (RGO) sheets as the electrode active material and EMIMBF4 ionic liquid as the electrolyte. One of the two series of supercapacitors was prepared according to an embodiment of instant invention and the other was by the conventional slurry coating of electrodes. Several significant observations can be made from these data:

(A) Both the gravimetric and volumetric energy densities and power densities of the supercapacitor cells prepared by the presently invented method (denoted as "inventive" in the figure legend) are significantly higher than those of their counterparts prepared via the conventional method (denoted as "conventional"). The differences are highly dramatic and are mainly due to the high active material mass loading (>20 mg/cm$^2$) associated with the presently invented cells, reduced proportion of overhead (non-active) components relative to the active material weight/volume, no need to have a binder resin, the ability of the inventive method to more effectively pack graphene sheets into pores of the foamed current collector.

(B) For the cells prepared by the conventional method, the absolute magnitudes of the volumetric energy densities and volumetric power densities are significantly lower than those of their gravimetric energy densities and gravimetric power densities, due to the very low tap density (packing density of 0.25 g/cm$^3$) of RGO-based electrodes prepared by the conventional slurry coating method.

(C) In contrast, for the cells prepared by the presently invented method, the absolute magnitudes of the volumetric energy densities (27.8 Wh/L) and volumetric power densities (10,171 W/L) are higher than those of their gravimetric energy densities and gravimetric power densities, due to the relatively high tap density (packing density of 1.15 g/cm$^3$) of RGO-based electrodes prepared by the presently invented method.

(D) The volumetric energy densities and volumetric power densities of corresponding supercapacitors prepared by the conventional process are 3.1 Wh/L and 1,139 W/L, respectively, which are one order of magnitude lower. These are dramatic and unexpected.

Figure 6:
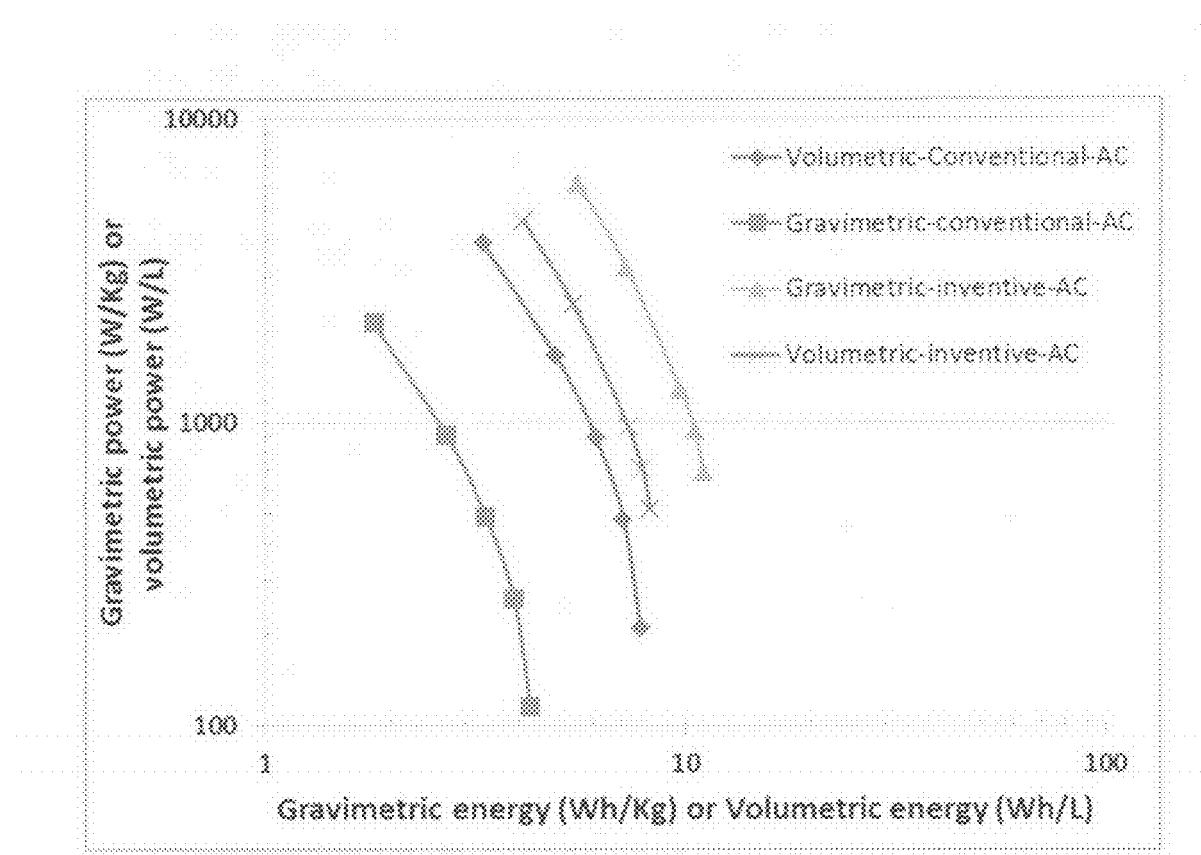
FIG. 6 Ragone plots (gravimetric and volumetric power density vs. energy density) of symmetric supercapacitor (EDLC) cells containing activated carbon (AC) particles as the electrode active material and organic liquid electrolyte. Supercapacitors were prepared according to an embodiment of instant invention and by the conventional slurry coating of electrodes.

FIG. 6 shows the Ragone plots (both gravimetric and volumetric power density vs. energy density) of symmetric supercapacitor (EDLC) cells containing activated carbon (AC) particles as the electrode active material and organic liquid electrolyte. The experimental data were obtained from the supercapacitors that were prepared by the presently invented method and those by the conventional slurry coating of electrodes.

These data also indicate that both the gravimetric and volumetric energy densities and power densities of the supercapacitor cells prepared by the presently invented method are significantly higher than those of their counterparts prepared via the conventional method. Again, the differences are huge and are mainly due to the high active material mass loading (>15 mg/cm$^2$) associated with the presently invented cells, reduced proportion of overhead (non-active) components relative to the active material weight/volume, no need to have a binder resin, the ability of the inventive method to more effectively pack graphene sheets into pores of the foamed current collectors. The highly porous activated carbon particles are not as amenable to more compact packing as graphene sheets. Consequently, for AC-based supercapacitors, the absolute magnitudes of the volumetric energy densities and volumetric power densities are lower than those of corresponding gravimetric energy densities and gravimetric power densities. However, the presently invented methods still surprisingly enables the AC particles to be packed with a significantly higher tap density (0.75 g/cm$^3$) than what is achieved with the conventional slurry coating process (0.55 g/cm$^3$) in the present study.

Figure 7A:
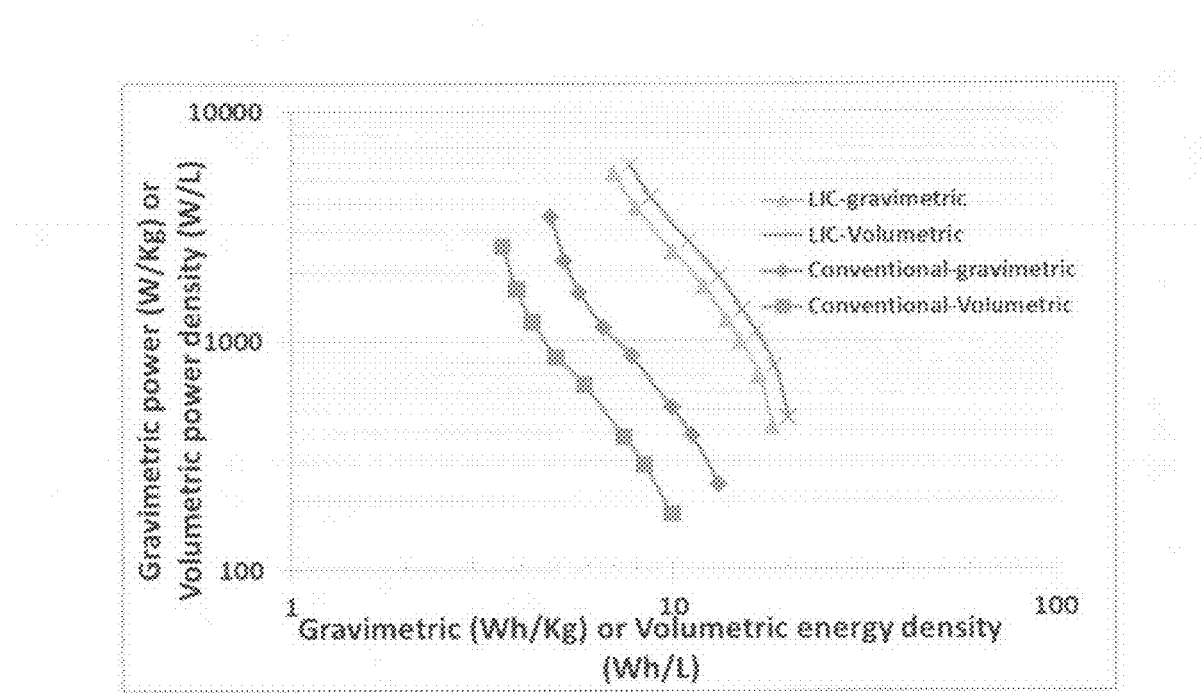
FIG. 7(A) Ragone plots (gravimetric and volumetric power density vs. energy density) of lithium ion capacitor (LIC) cells containing pristine graphene sheets as the electrode active material and lithium salt-PC/DEC organic liquid electrolyte. Supercapacitors were prepared according to an embodiment of instant invention and by the conventional slurry coating of electrodes.

Shown in FIG. 7(A) are Ragone plots of lithium ion capacitor (LIC) cells containing pristine graphene sheets as the cathode active material, prelithiated graphite particles as the anode active material, and lithium salt (LiPF$_6$)-PC/DEC as organic liquid electrolyte. The data are for both LICs prepared by the presently invented method and those by the conventional slurry coating of electrodes. These data indicate that both the gravimetric and volumetric energy densities and power densities of the LIC cells prepared by the presently invented method are significantly higher than those of their counterparts prepared via the conventional method. Again, the differences are huge and are mainly ascribed to the high active material mass loading (>15 mg/cm$^2$ at the anode side and >25 mg/cm$^2$ at the cathode side) associated with the presently invented cells, reduced proportion of overhead (non-active) components relative to the active material weight/volume, no need to have a binder resin, the ability of the inventive method to more effectively pack graphene sheets into pores of the foamed current collectors.

For the LIC cells prepared by the conventional method, the absolute magnitudes of the volumetric energy densities and volumetric power densities are significantly lower than those of their gravimetric energy densities and gravimetric power densities, due to the very low tap density (packing density of 0.25 g/cm$^3$) of pristine graphene-based cathodes prepared by the conventional slurry coating method. In contrast, for the LIC cells prepared by the instant method, the absolute magnitudes of the volumetric energy densities and volumetric power densities are higher than those of their gravimetric energy densities and gravimetric power densities, due to the relatively high tap density of pristine graphene-based cathodes prepared by the presently invented method.

Figure 7B:
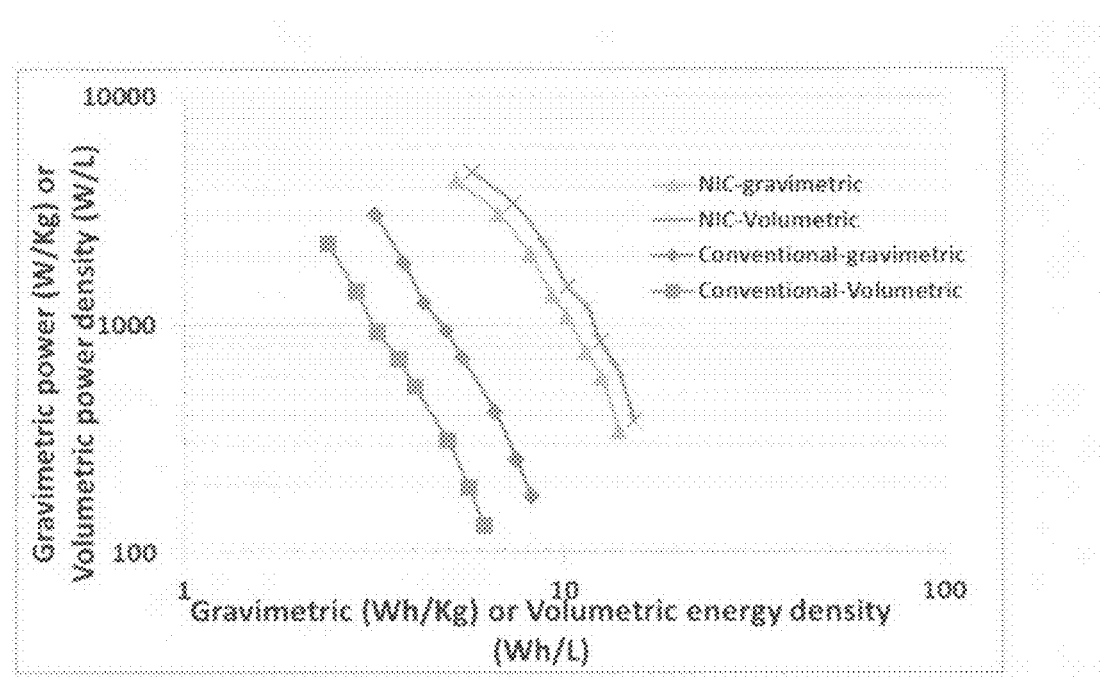
FIG. 7(B) Ragone plots (gravimetric and volumetric power density vs. energy density) of sodium ion capacitor (NIC) cells containing pristine graphene sheets as the electrode active material and sodium salt-PC/DEC organic liquid electrolyte.

Shown in FIG. 7(B) are Ragone plots of sodium-ion capacitor (NIC) cells containing pristine graphene sheets as the cathode active material, pre-sodiated graphite particles as the anode active material, and sodium salt (NaPF$_6$)-PC/DEC as organic liquid electrolyte. The data are for both LICs prepared by the presently invented method and those by the conventional slurry coating of electrodes. These data indicate that both the gravimetric and volumetric energy densities and power densities of the NIC cells prepared by the presently invented method are significantly higher than those of their counterparts prepared via the conventional method. Again, the differences are dramatic and are mainly due to the high active material mass loading (>15 mg/cm$^2$ at the anode side and >25 mg/cm$^2$ at the cathode side) associated with the presently invented cells, reduced proportion of overhead (non-active) components relative to the active material weight/volume, no need to have a binder resin, the ability of the inventive method to more effectively pack graphene sheets into pores of the foamed current collectors.

It is of significance to point out that reporting the energy and power densities per weight of active material alone on a Ragone plot, as did by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional supercapacitor production processes. The present invention overcomes this long-standing, most serious problem in the art of supercapacitors.

In a commercial supercapacitor having an electrode thickness of 150-200 μm (75-100 μm on each side of an Al foil current collector), the weight of the active material (i.e. activated carbon) accounts for about 25%-30% of the total mass of the packaged cell. Hence, a factor of 3 to 4 is frequently used to extrapolate the energy or power densities of the device (cell) from the properties based on the active material weight alone. In most of the scientific papers, the properties reported are typically based on the active material weight alone and the electrodes are typically very thin (<<100 μm, and mostly <<50 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial supercapacitors. Thus, one must be very careful when it comes to read and interpret the performance data of supercapacitors reported in the scientific papers and patent applications.

EXAMPLE 14

Achievable Electrode Thickness and its Effect on Electrochemical Performance of Supercapacitor Cells One might be tempted to think the electrode thickness of a supercapacitor is a design parameter that can be freely adjusted for optimization of device performance; but, in reality, the supercapacitor thickness is manufacturing-limited and one cannot produce electrodes of good structural integrity that exceed certain thickness level. Our studies further indicate that this problem is even more severe with graphene-based electrode. The instant invention solves this critically important issue associated with supercapacitors.

Figure 8:
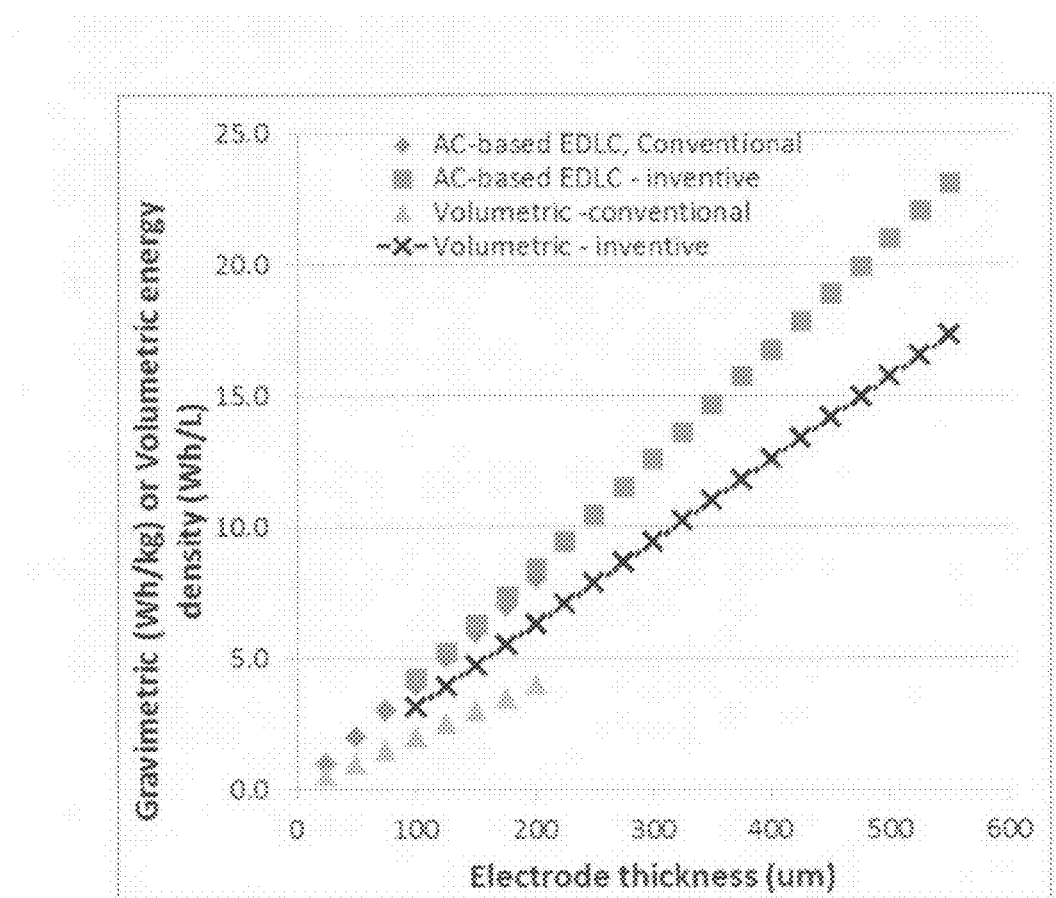
FIG. 8 The cell-level gravimetric and volumetric energy densities plotted over the achievable electrode thickness range of the AC-based EDLC supercapacitors prepared via the conventional method and the presently invented method. Legends: the gravimetric (♦) and volumetric (▲) energy density of the conventional supercapaitors and the gravimetric (■) and volumetric (×) energy density of the inventive supercapaitors. With the presently invented method, there is no theoretical limit on the electrode thickness that can be achieved. Typically, the practical electrode thickness is from 10 μm to 5,000 μm, more typically from 100 μm to 1,00 μm, and most typically from 200 μm to 800 μm.

Shown in FIG. 8 are the cell-level gravimetric (Wh/kg) and volumetric energy densities (Wh/L) plotted over the achievable electrode thickness range of the activated carbon-based symmetric EDLC supercapaitors prepared via the conventional method and those by the presently invented method. In this figure, the data points are labelled as the gravimetric (♦) and volumetric (▲) energy density of the conventional supercapaitors and the gravimetric (■) and volumetric (×) energy density of the presently invented supercapaitors. The activated carbon-based electrodes can be fabricated up to a thickness of 100-200 μm using the conventional slurry coating process. However, in contrast, there is no theoretical limit on the electrode thickness that can be achieved with the presently invented method. Typically, the practical electrode thickness is from 10 μm to 5000 μm, more typically from 50 μm to 2,000 μm, further more typically from 100 μm to 1,000 μm, and most typically from 200 μm to 800 μm.

These data further confirm the surprising effectiveness of the presently invented method in producing ultra-thick supercapacitor electrodes not previously achievable. These ultra-thick electrodes lead to exceptionally high active material mass loading, typically significantly >10 mg/cm$^2$ (more typically >15 mg/cm$^2$, further typically >20 mg/cm$^2$, often >25 mg/cm$^2$, and even >30 mg/cm$^2$). These high active material mass loadings have not been possible to obtain with conventional supercapacitors made by the slurry coating processes.

Further significantly, the typical cell-level energy densities of commercial AC-based supercapacitors are from 3 to 8 Wh/kg and from 1 to 4 Wh/L. In contrast, the presently invented method enables supercapacitors containing the same type of electrode active material (AC) to deliver an energy density up to 11 Wh/kg or 8.2 Wh/L. Such an increase in energy density has not been considered possible in the supercapacitor industry.

Figure 9:
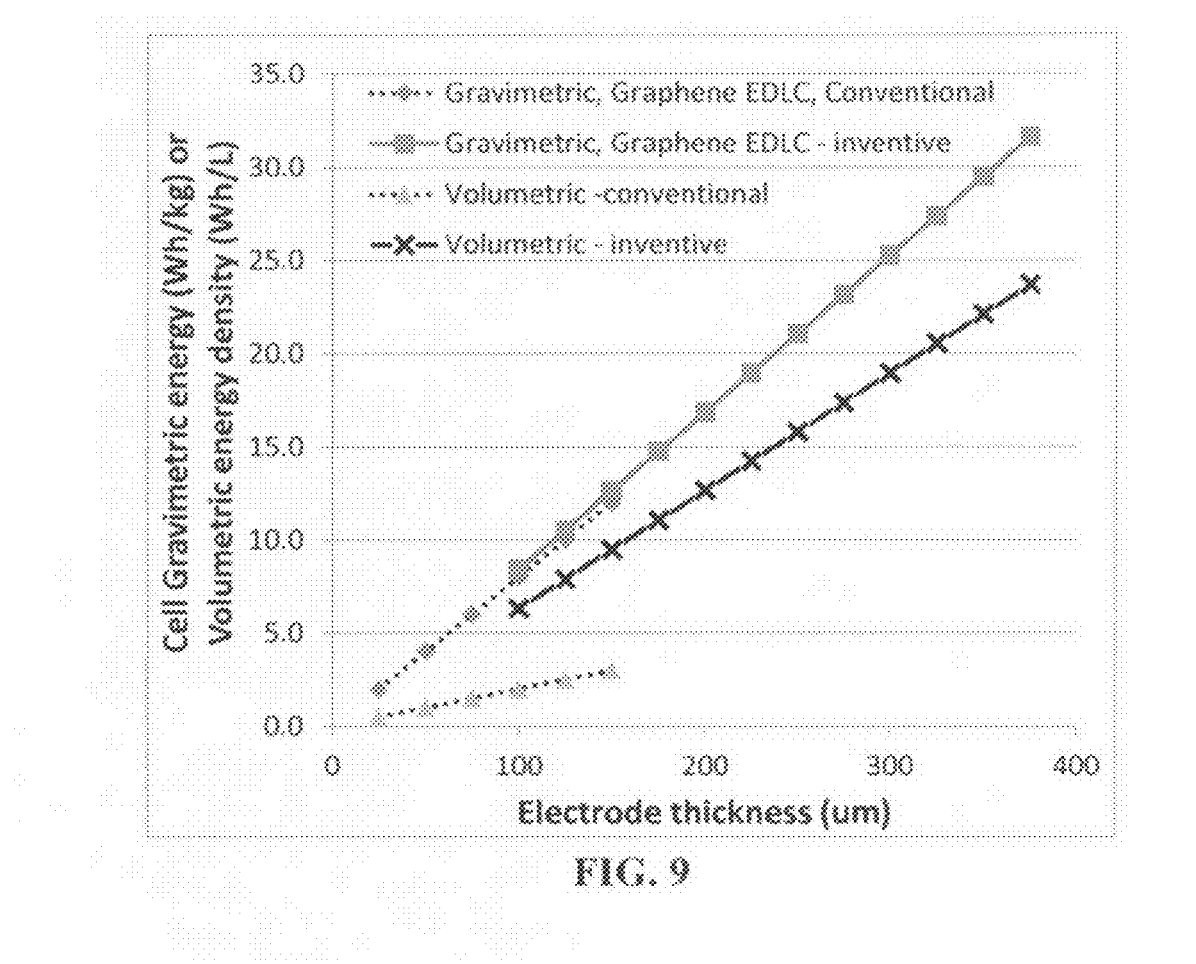
FIG. 9 The cell-level gravimetric and volumetric energy densities plotted over the achievable electrode thickness range of the RGO-based EDLC supercapacitors (organic liquid electrolyte) prepared via the conventional method and the presently invented method (easily achieved electrode tap density of approximately 0.75 g/cm$^3$).

Also highly significant and unexpected are the data summarized in FIG. 9 for reduced graphene oxide-based EDLC supercapacitors. The cell-level gravimetric and volumetric energy densities plotted over the achievable electrode thickness range of the RGO-based EDLC supercapacitors (organic liquid electrolyte) prepared via the conventional method and those by the presently invented method. In this figure, the gravimetric (♦) and volumetric (▲) energy density of the conventional supercapaitors are based on the highest achieved electrode tap density of approximately 0.25 g/cm$^3$, and the gravimetric (■) and volumetric (×) energy density of the presently invented supercapaitors are from those having an electrode tap density of approximately 0.75 g/cm$^3$, by no means the highest. No one else has previously reported such a high tap density for un-treated, non-activated RGO electrodes.

These data indicate that the highest gravimetric energy density achieved with RGO-based EDLC supercapacitor cells produced by the conventional slurry coating method is approximately 12 Wh/kg, but those prepared by the presently invented method exhibit a gravimetric energy density as high as 31.6 Wh/kg at room temperature. This is an unprecedentedly high energy density value for EDLC supercapacitors (based on the total cell weight, not the electrode weight or active material weight alone). Even more impressive is the observation that the volumetric energy density of the presently invented supercapacitor cell is as high as 23.7 Wh/L, which is more than 7 times greater than the 3.0 Wh/L achieved by the conventional counterparts.

Figure 10:
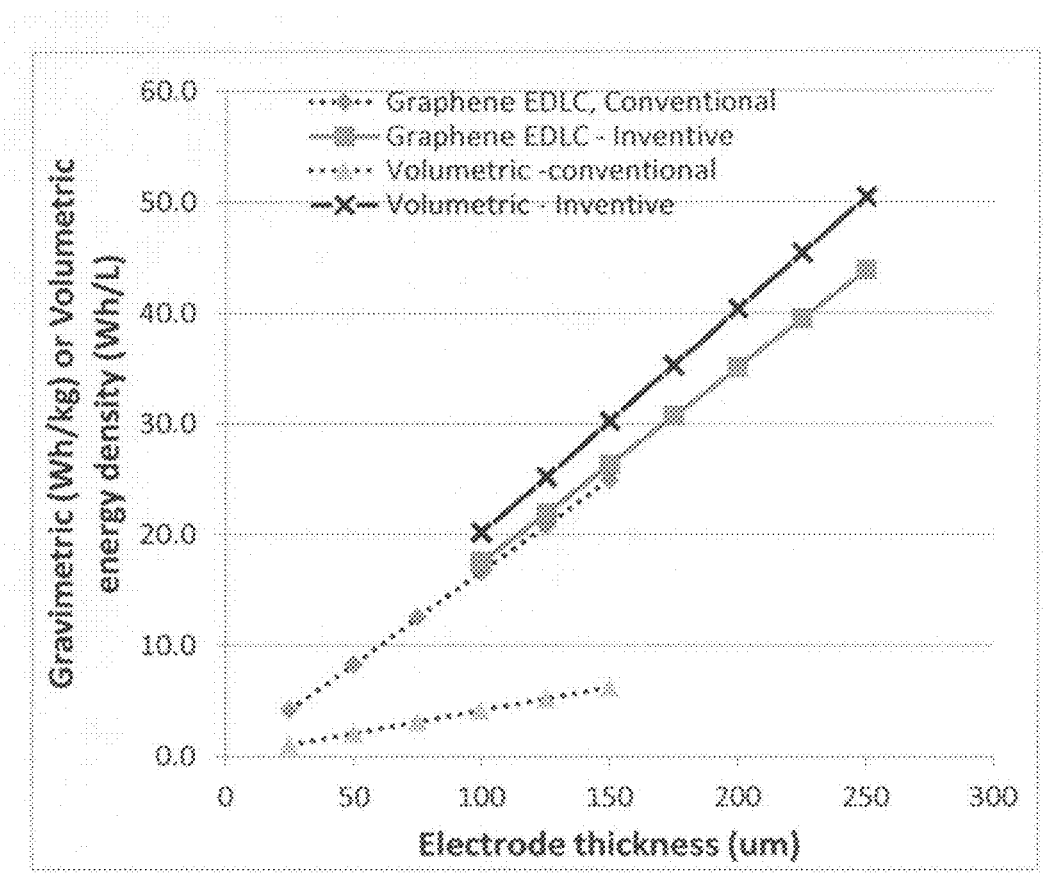
FIG. 10 The cell-level gravimetric and volumetric energy densities plotted over the achievable electrode thickness range of the pristine graphene-based EDLC supercapacitors (organic liquid electrolyte) prepared via the conventional method and the presently invented method (electrode tap density of approximately 1.15 g/cm$^3$).

Summarized in FIG. 10 are the data of the cell-level gravimetric and volumetric energy densities plotted over the achievable electrode thickness range of the pristine graphene-based EDLC supercapacitors (organic liquid electrolyte) prepared via the conventional method and those by the presently invented method. The legends include the gravimetric (♦) and volumetric (▲) energy density of the conventional supercapaitors (highest achieved electrode tap density of approximately 0.25 g/cm$^3$) and the gravimetric (■) and volumetric (×) energy density of the presently invented supercapaitors (electrode tap density of approximately 1.15 g/cm$^3$).

Quite significantly, these EDLC supercapacitors (without any redox or pseudo-capacitance) deliver a gravimetric energy density as high as 43.9 Wh/kg, which already exceeds the energy densities (20-40 Wh/kg) of advanced lead-acid batteries. This is of high utility value since an EDLC supercapacitor can be charged and discharged for 250,000-500,000 cycles, as opposed to the typical 100-400 cycles of lead-acid batteries. This achievement is very dramatic and totally unexpected in the art of supercapacitors. In addition, carbon- or graphene-based EDLC supercapacitors can be re-charged in seconds, in contrast to the typically hours of recharge time required of lead-acid batteries. Lead-acid batteries are notorious for their highly negative environmental impact, yet the instant supercapacitors are environmentally benign.

Figure 11:
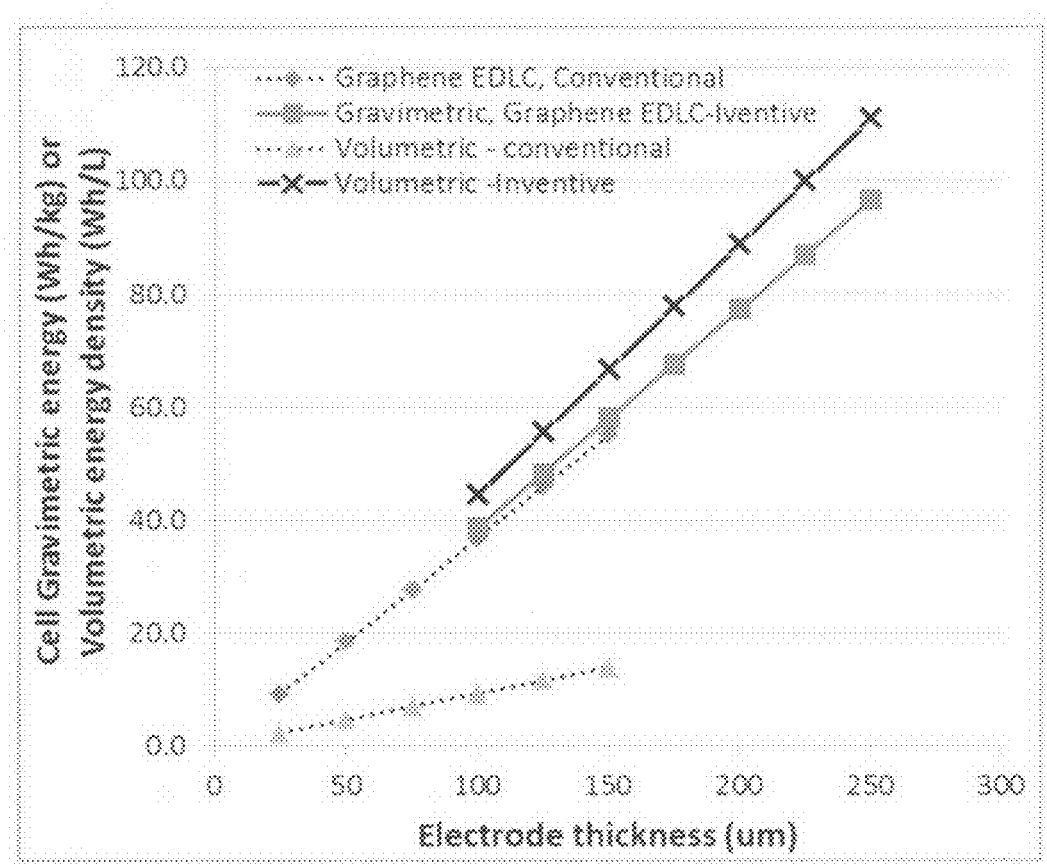
FIG. 11 The cell-level gravimetric and volumetric energy densities plotted over the achievable electrode thickness range of the pristine graphene-based EDLC supercapacitors (ionic liquid electrolyte) prepared via the conventional method and the presently invented method (electrode tap density of approximately 1.15 g/cm$^3$).

Further significant examples include those data summarized in FIG. 11 for the cell-level gravimetric and volumetric energy densities plotted over the achievable electrode thickness range of the pristine graphene-based EDLC supercapaitors (ionic liquid electrolyte) prepared via the conventional method and those via the presently invented method. The gravimetric (♦) and volumetric (▲) energy density are for those conventional supercapaitors (highest achieved electrode tap density of approximately 0.25 g/cm$^3$) and the gravimetric (■) and volumetric (×) energy density are for those inventive supercapaitors having an electrode tap density of approximately 1.15 g/cm³. The presently invented pristine graphene-based EDLC supercapacitors are capable of storing a cell-level energy density of 97.7 Wh/kg, which is 15 times greater than what could be achieved by conventional AC-based EDLC supercapacitors. The volumetric energy density value of 112.3 Wh/L is also unprecedented and is 30-fold greater than the 3-4 Wh/L of commercial AC-based supercapacitors.

EXAMPLE 15

Achievable Active Material Weight Percentage in a Cell and its Effect on Electrochemical Performance of Supercapacitor Cells Because the active material weight accounts for up to about 30% of the total mass of the packaged commercial supercapacitors, a factor of 30% must be used to extrapolate the energy or power densities of the device from the performance data of the active material alone. Thus, the energy density of 20 Wh/kg of activated carbon (i.e. based on the active material weight alone) will translate to about 6 Wh/kg of the packaged cell. However, this extrapolation is only valid for electrodes with thicknesses and densities similar to those of commercial electrodes (150 μm or about 10 mg/cm² of the carbon electrode). An electrode of the same active material that is thinner or lighter will mean an even lower energy or power density based on the cell weight. Thus, it would be desirable to produce a supercapacitor cell having a high active material proportion. Unfortunately, it has not been previously possible to achieve an active material proportion greater than 30% by weight for activated carbon-based supercapacitors or greater than 15% by weight for graphene-based supercapacitors.

The presently invented method enables the supercapacitors to go well beyond these limits for all active materials investigated. As a matter of fact, the instant invention makes it possible to elevate the active material proportion above 90% if so desired; but typically from 15% to 85%, more typically from 30% to 80%, even more typically from 40% to 75%, and most typically from 50% to 70%.

Figure 12:
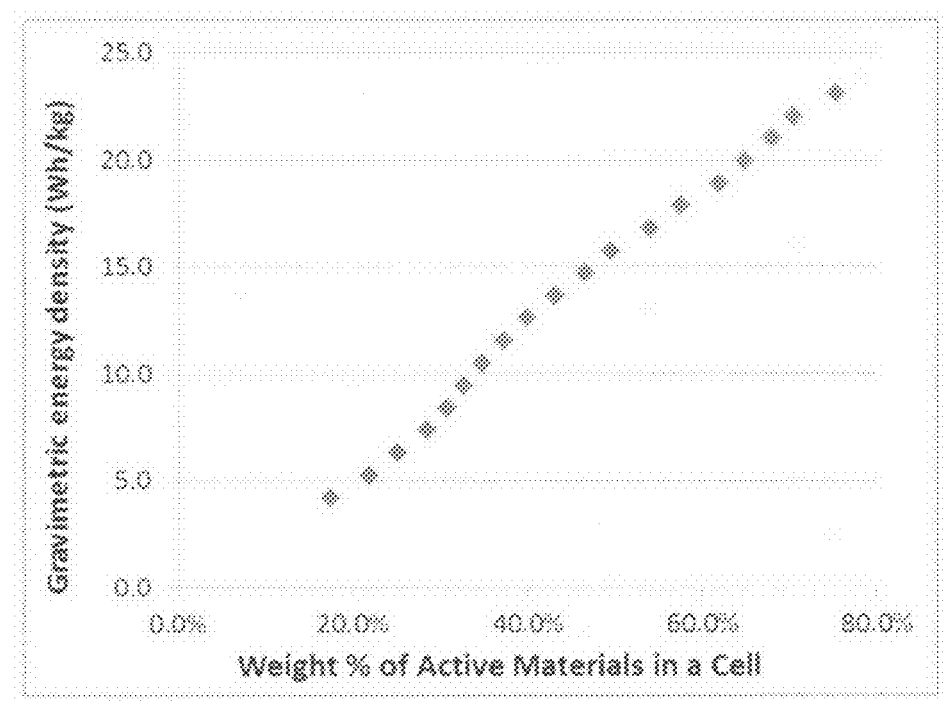
FIG. 12 The cell-level gravimetric energy densities plotted over the achievable active material proportion (active material weight/total cell weight) for activated carbon-based EDLC supercapacitors (with organic liquid electrolyte).
Figure 13:
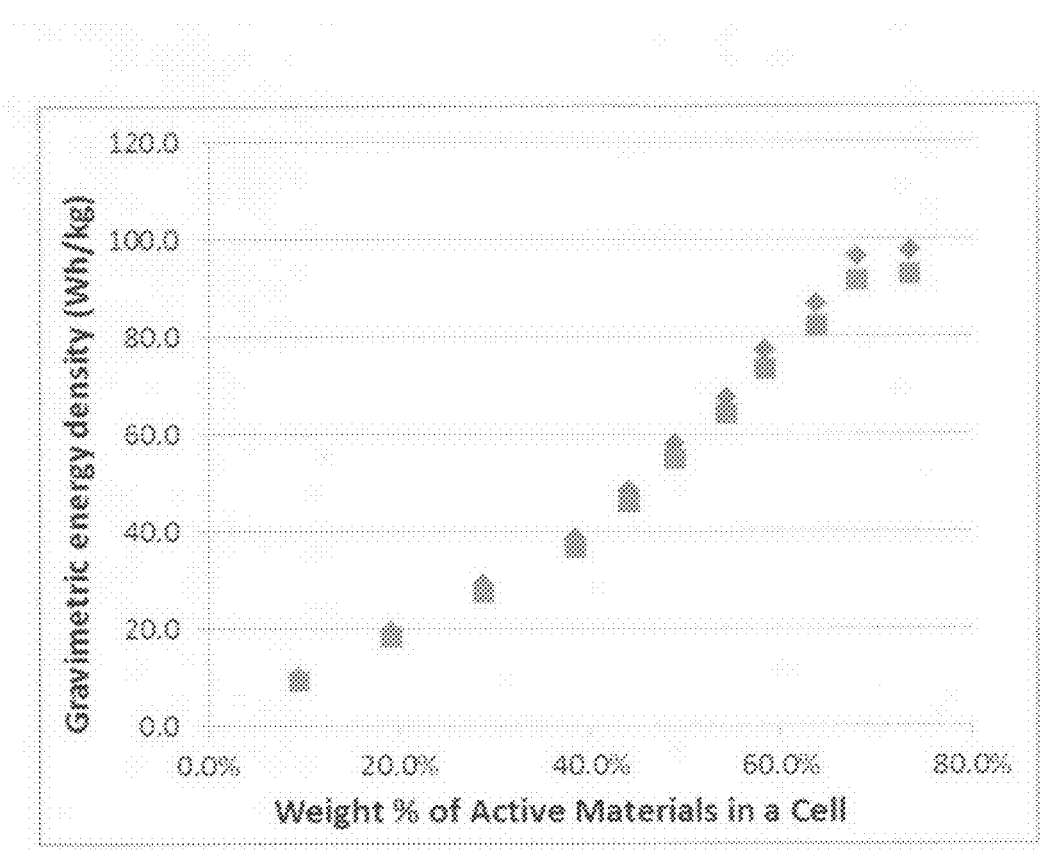
FIG. 13 The cell-level gravimetric energy densities plotted over the achievable active material proportion (active material weight/total cell weight) in a supercapacitor cell for two series of pristine graphene-based EDLC supercapacitors (all with organic liquid electrolyte).
Figure 14:
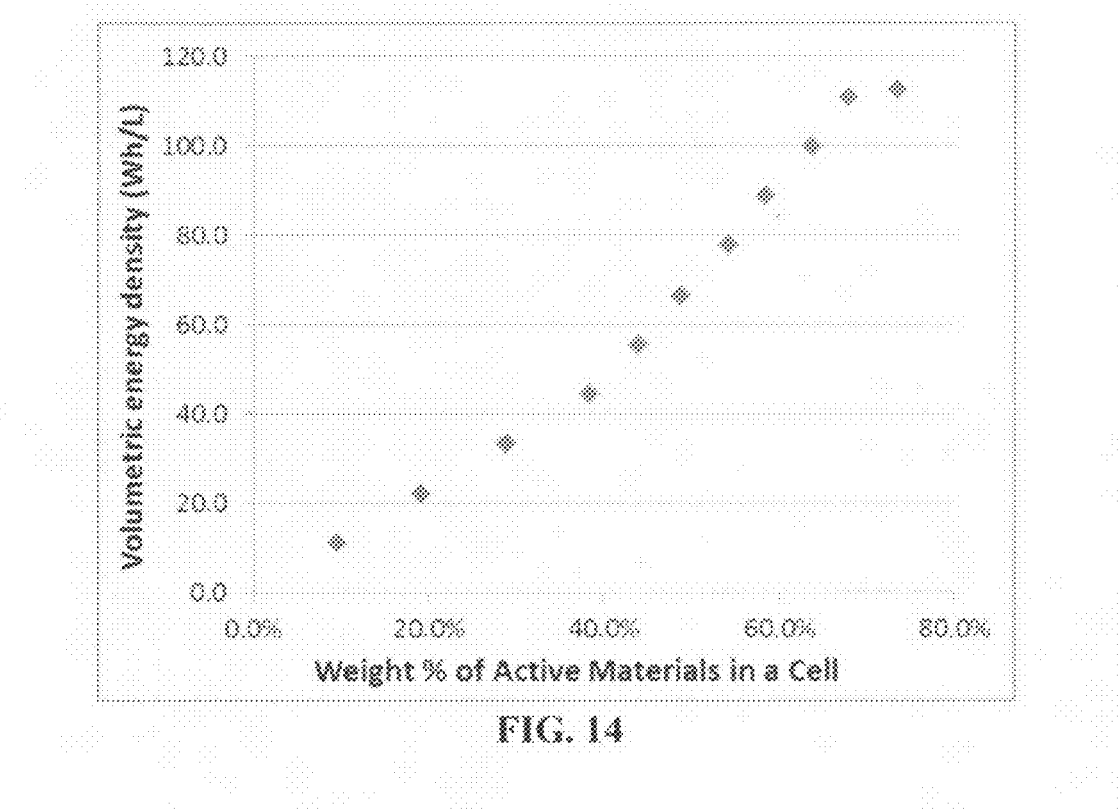
FIG. 14 The cell-level volumetric energy densities plotted over the achievable active material proportion (active material weight/total cell weight) for pristine graphene-based EDLC supercapacitors (with ionic liquid electrolyte).

As shown in FIG. 12, the cell-level gravimetric energy densities of the activated carbon-based EDLC supercapacitors (with organic liquid electrolyte) are plotted over the achievable active material proportion (active material weight/total cell weight), which are from 17.5% to 75.4%. The instant invention also allows us to achieve a pristine graphene content in a supercapacitor cell from 9.6% to 78.2% by weight, resulting in a gravimetric energy density from 9.6 Wh/kg to 97.7 Wh/kg. For instance, FIG. 13 shows the cell-level gravimetric energy densities plotted over the achievable active material proportion (active material weight/total cell weight) in a supercapacitor cell for two series of pristine graphene-based EDLC supercapacitors (all with organic liquid electrolyte). FIG. 14 shows the cell-level volumetric energy densities plotted over the achievable active material proportion (active material weight/total cell weight) for pristine graphene-based EDLC supercapacitors (with ionic liquid electrolyte).

EXAMPLE 16

The Electrochemical Performance of Supercapacitor Cells Based on Various Electrode Active Materials and/or Different Porous or Foamed Structures as Current Collectors In order to evaluate the effect of the foam structure, we chose to use RGO as an example of electrode active material but vary the type and nature of the current collector. A wide variety of foams were selected, ranging from metal foam (e.g. Ni and Ti foam), metal web or screen (e.g. stainless steel web), perforated metal sheet-based 3-D structure, metal fiber mat (steel fibers), metal nanowire mat (Cu nanowires), conductive polymer nano-fiber mat (polyaniline), conductive polymer foam (e.g. PEDOT), conductive polymer-coated fiber foam (polypyrroe-coated nylon fibers), carbon foam, graphite foam, carbon aerogel, carbon xerogel, graphene foam (from Ni-supported CVD graphene), graphene oxide foam (obtained via freeze-drying GO-water solution), reduced graphene oxide foam (RGO mixed with a polymer and then carbonized), carbon fiber foam, graphite fiber foam, and exfoliated graphite foam (exfoliated graphite worms bonded by a carbonized resin). This extensive and in-depth study leads to the following important observations:

(A) The electrical conductivity of the foam material is an important parameter with a higher conductivity tending to result in a higher power density and faster supercapacitor response time.

B) The porosity level is also an important parameter with a higher pore content resulting in a larger amount of active material given the same volume, leading to a higher energy density. However, a higher porosity level can lead to slower response time possibly due to a lower electron-conducting capability.

(C) Graphite foams and graphene foams provide better response time of a supercapacitor. However, metal foam enables more ready formation of or connection to a tab (terminal lead). Two leads are required in each cell.

A wide variety of electrode active materials for both EDLC and redox supercapacitors have been investigated, covering organic and inorganic materials, in combination with aqueous, organic, and ionic liquid electrolytes. Summarized in the following table (Table 1) are some examples of different classes of supercapacitors for illustration purposes. These should not to be construed as limiting the scope of the instant application.

TABLE 1

Examples of supercapacitors prepared by the new method and their counterparts prepared by the conventional slurry coating method.

| Sample ID | Active materials | Electrolyte | Electrode thickness (μm) and method | Active mass loading (g/cm²) | Gravimetric energy density (Wh/kg) | Volumetric energy density (Wh/L) |
|---|---|---|---|---|---|---|
| PPy-1 | Polypyrrole-cellulose | 2M NaCl in $H_2O$ | 535, new | 41 | 46 | 24 |
| PPy-c | Polypyrrole-cellulose | 2M NaCl in $H_2O$ | 190, conventional | 13.2 | 8.8 | 3.1 |

TABLE 1-continued

Examples of supercapacitors prepared by the new method and their counterparts prepared by the conventional slurry coating method.

| Sample ID | Active materials | Electrolyte | Electrode thickness (μm) and method | Active mass loading (g/cm²) | Gravimetric energy density (Wh/kg) | Volumetric energy density (Wh/L) |
|---|---|---|---|---|---|---|
| $RuO_2$-AC-1 | $RuO_2$ + AC | 1M NaCl in $H_2O$ | 355, new | 16 | 37.7 | 26.6 |
| $RuO_2$-AC-c | $RuO_2$ + AC | 1M NaCl in $H_2O$ | 160, conventional | 7.2 | 11.6 | 7.7 |
| NiO-RGO-1 | NiO + activated GO | 1M LiOH in $H_2O$ | 555, new | 26.6 | 44.2 | 35.7 |
| NiO-RGO-c | NiO + Activated GO | 1M LiOH in $H_2O$ | 160, conventional | 4.6 | 9.2 | 7.3 |
| $V_2O_5$-NGn-1 | $V_2O_5$ + nitrogenated graphene | THF + $N(Et)_4BF_4$ | 627, new | 27.4 | 41.3 | 35.4 |
| $V_2O_5$-NGn-c | $V_2O_5$ + nitrogenated graphene | THF + $N(Et)_4BF_4$ | 175, conventional | 5.6 | 7.2 | 5.6 |
| $MnO_2$-RGO-1 | $MnO_2$ + RGO | 1.0M $Na_2SO_4$ | 420, new | 17.2 | 85 | 84 |
| $MnO_2$-RGO-c | $MnO_2$ + RGO | 1.0M $Na_2SO_4$ | 187, conventional | 6.2 | 29 | 23 |
| $MoS_2$-1 | $MoS_2$/RGO | Acetonitrile + $N(Et)_4BF_4$ | 375, new | 25.8 | 42.3 | 35.8 |
| $MoS_2$-c | $MoS_2$/RGO | Acetonitrile + $N(Et)_4BF_4$ | 155, conventional | 8.8 | 13.2 | 9.6 |
| $Ti_2CT_x$-1 | $Ti_2C(OH)_2$/quinone GO | 1M LiOH in $H_2O$ | 331, new | 15.6 | 15.8 | 12.7 |
| $Ti_2CT_x$-c | $Ti_2C(OH)_2$/quinone GO | 1M LiOH in $H_2O$ | 167, conventional | 4.5 | 6.7 | 4.2 |
| CNT-1 | MWCNT | EMI-TFSI | 275 | 12.7 | 25.8 | 16.7 |
| CNT-c | MWCNT | EMI-TFSI | 95 | 2.3 | 6.2 | 3.2 |

These data further confirm the surprising superiority of the presently invented method of producing supercapacitor cells in terms of dramatically improving mass loading, electrode thickness, gravimetric energy density, and volumetric energy density. The presently invented supercapacitors are consistently much better the conventional supercapacitors in electrochemical properties. The differences are surprisingly dramatic.

In conclusion, we have successfully developed a new and novel class of supercapacitors that have unexpectedly thick electrodes (not previously achievable), large active material mass loading (not previously achievable), outstanding gravimetric energy density (not previously achievable), and unprecedentedly high volumetric energy density. The invented method of direct injection of an active material-electrolyte mixture into foamed current collectors also overcomes the long-standing problems associated with graphene sheet-based supercapacitors (i.e. inability to make thick electrodes, difficulty in preventing graphene sheet re-stacking, low tap density, and low volumetric energy density).

We claim:

1. A process for producing a supercapacitor cell, said process comprising:
   (A) continuously feeding a first electrically conductive porous layer to a cathode material impregnation zone, wherein said first conductive porous layer has two opposed porous surfaces and contains interconnected electron-conducting pathways and at least 70% by volume of pores;
   (B) impregnating a wet cathode active material mixture into said first electrically conductive porous layer from at least one of said two porous surfaces to form a cathode electrode, wherein said wet cathode active material mixture contains a cathode active material and an optional conductive additive mixed with a first liquid electrolyte;
   (C) continuously feeding a second electrically conductive porous layer to an anode material impregnation zone, wherein said second conductive porous layer has two opposed porous surfaces and contains interconnected electron-conducting pathways and at least 70% by volume of pores;
   (D) impregnating a wet anode active material mixture into said second electrically conductive porous layer from at least one of said two porous surfaces to form an anode electrode, wherein said wet anode active material mixture contains an anode active material and an optional conductive additive mixed with a second liquid electrolyte; and
   (E) stacking said anode electrode, a porous separator, and said cathode electrode to form said supercapacitor cell, wherein said anode electrode and/or said cathode electrode has a thickness no less than 100 μm; and/or wherein said anode active material or said cathode active material constitutes an electrode active material loading no less than 7 mg/cm² in said anode or said cathode.

2. The process of claim 1, wherein step (A) and step (B) include delivering said wet cathode active material mixture to said at least one porous surface through spraying, printing, coating, casting, conveyor film delivery, and/or roller surface delivery; and/or wherein step (C) and step (D) include delivering said wet anode active material mixture to said at least one porous surface through spraying, printing, coating, casting, conveyor film delivery, and/or roller surface delivery.

3. The process of claim 1, wherein said anode active material and/or said cathode active material contains multiple particles of a carbon material and/or multiple graphene sheets, wherein said multiple graphene sheets contain single-layer graphene or few-layer graphene each having from 1 to 10 graphene planes and said multiple particles of carbon material have a specific surface area no less than 500 $m^2/g$ when measured in a dried state.

4. The process of claim 3, wherein said graphene sheets are selected from the group consisting of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, physically or chemically activated or etched versions thereof, and combinations thereof.

5. The process of claim 3, wherein said anode active material or cathode active material further contains a redox pair partner material selected from a metal oxide, a conducting polymer, an organic material, a non-graphene carbon material, an inorganic material, or a combination thereof, wherein said partner material, in combination with graphene or a carbon material, form a redox pair for pseudo-capacitance.

6. The process of claim 5, wherein said metal oxide is selected from $RuO_2$, $IrO_2$, NiO, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, or a combination thereof.

7. The process of claim 5, wherein said inorganic material is selected from a metal carbide, metal nitride, metal boride, metal dichalcogenide, or a combination thereof.

8. The process of claim 5, wherein said metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nanodisc, nanoribbon, or nanoplatelet form.

9. The process of claim 5, wherein said inorganic material is selected from nanodiscs, nanoplatelets, nano-coating, or nanosheets of an inorganic material selected from: (a) bismuth selenide or bismuth telluride, (b) transition metal dichalcogenide or trichalcogenide, (c) sulfide, selenide, or telluride of a transition metal; (d) boron nitride, or (e) a combination thereof; wherein said nanodiscs, nanoplatelets, or nanosheets have a thickness less than 100 nm.

10. The process of claim 3, wherein said carbon material is selected from activated carbon, activated meso-carbon micro beads, activated graphite, activated or chemically etched carbon black, activated hard carbon, activated soft carbon, carbon nanotube, carbon nanofiber, activated carbon fiber, activated graphite fiber, exfoliated graphite worms, activated graphite worms, activated expanded graphite flakes, or a combination thereof.

11. The process of claim 1, wherein said first and/or second electrically conductive porous layer has a thickness no less than 200 μm, has at least 85% by volume of pores, and/or said electrode active material loading is no less than 10 $mg/cm^2$.

12. The process of claim 1, wherein said first and/or second electrically conductive porous layer has a thickness no less than 300 μm, has at least 90% by volume of pores, and/or said electrode active material loading is no less than 15 $mg/cm^2$.

13. The process of claim 1, wherein said first and/or second electrically conductive porous layer has a thickness no less than 400 μm, has at least 95% by volume of pores, and/or said electrode active material loading is no less than 20 $mg/cm^2$.

14. The process of claim 1, wherein said first and/or second electrically conductive porous layer is selected from metal foam, metal web or screen, perforated metal sheet-based 3-D structure, metal fiber mat, metal nanowire mat, conductive polymer nano-fiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

15. The process of claim 1, wherein said anode or said cathode contains graphene sheets as the only electrode active material and does not contain any other electrode active material.

16. The process of claim 1, wherein said anode or said cathode contains the following materials as the only electrode active material in said anode or cathode: (a) graphene sheets alone; (b) graphene sheets mixed with a carbon material; (c) graphene sheets mixed with a partner material that forms a redox pair with said graphene sheets to develop pseudo-capacitance; or (d) graphene sheets and a carbon material mixed with a partner material that forms a redox pair with said graphene sheets or said carbon material to develop pseudo-capacitance, and wherein there is no other electrode active material in said anode or cathode.

17. The process of claim 1, wherein a volume ratio of said anode active material-to-said liquid electrolyte in said wet anode active material mixture is from 1/5 to 20/1 and/or a volume ratio of said cathode active material-to-said liquid electrolyte in said wet cathode active material mixture is from 1/5 to 20/1.

18. The process of claim 1, wherein a volume ratio of said anode active material-to-said liquid electrolyte in said wet anode active material mixture is from 1/3 to 5/1 and/or a volume ratio of said cathode active material-to-said liquid electrolyte in said wet cathode active material mixture is from 1/3 to 5/1.

19. The process of claim 1, wherein said anode active material and/or said cathode active material contains nanodiscs, nanoplatelets, nano-coating, or nanosheets of an inorganic material selected from: (i) bismuth selenide or bismuth telluride, (ii) transition metal dichalcogenide or trichalcogenide, (iii) sulfide, selenide, or telluride of a transition metal; (iv) boron nitride, or (v) a combination thereof, wherein said nanodiscs, nanoplatelets, nano-coating, or nanosheets have a thickness less than 100 nm and a specific surface area no less than 200 $m^2/g$ when measured in a dried state.

20. The process of claim 19, wherein said anode active material or cathode active material further contains graphene sheets selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

21. The process of claim 19, wherein said anode active material or cathode active material further contains a redox pair partner material selected from a carbon material, a graphene material, a metal oxide, a conducting polymer, an organic material, or a combination thereof, wherein said partner material, in combination with said inorganic material, form a redox pair for obtaining pseudo-capacitance.

22. The process of claim 21, wherein said metal oxide is selected from $RuO_2$, $IrO_2$, NiO, $MnO_2$, $VO_2$, $TiO_2$, $Cr_2O_3$, $Co_2O_3$, $Co_3O_4$, $PbO_2$, $Ag_2O$, or a combination thereof.

23. The process of claim 1, wherein said first liquid electrolyte or said second liquid electrolyte is selected from an aqueous liquid, an organic liquid, an ionic liquid, or a mixture of an organic liquid and an ionic liquid.

24. The process of claim 1, wherein said anode active material is different than the cathode active material.

25. The process of claim 1, wherein said anode active material or said cathode active material constitutes an electrode active material loading greater than 10 $mg/cm^2$ and/or wherein said anode electrode or cathode electrode has a thickness no less than 200 μm.

26. The process of claim 25, wherein said anode or cathode active material loading is greater than 15 $mg/cm^2$, said anode active material and said cathode active material combined exceeds 40% by weight of said supercapacitor cell, and/or said anode electrode or cathode electrode has a thickness no less than 300 μm.

27. The process of claim 25, wherein said anode or cathode active material loading is greater than 20 $mg/cm^2$, said anode active material and said cathode active material combined exceeds 50% by weight of said supercapacitor cell, and/or said anode electrode or cathode electrode has a thickness no less than 400 μm.

28. The process of claim 25, wherein said anode active material and said cathode active material combined exceeds 60% by weight of said supercapacitor cell, and/or said anode electrode or cathode electrode has a thickness no less than 500 μm.

29. A process for producing an electrode for a supercapacitor cell, said process comprising:
(A) continuously feeding an electrically conductive porous layer to an anode or cathode material impregnation zone, wherein said conductive porous layer has two opposed porous surfaces and contains interconnected electron-conducting pathways and at least 70% by volume of pores; and
(B) impregnating a wet anode or cathode active material mixture into said electrically conductive porous layer from at least one of said two porous surfaces to form an anode electrode or cathode electrode, wherein said wet anode or cathode active material mixture contains an anode or cathode active material and an optional conductive additive mixed with a liquid electrolyte.

30. The process of claim 29, further comprising a step of supplying at least a protective film to cover said at least one porous surface to form a protected electrode.

31. A process for producing a supercapacitor cell, wherein said supercapacitor cell is a lithium-ion capacitor or sodium-ion capacitor and said process comprises:
(A) continuously feeding a first electrically conductive porous layer to a cathode material impregnation zone, wherein said first conductive porous layer has two opposed porous surfaces and contain interconnected electron-conducting pathways and at least 70% by volume of pores;
(B) impregnating a wet cathode active material mixture into said first electrically conductive porous layer from at least one of said two porous surfaces to form a cathode electrode, wherein said wet cathode active material mixture contains a cathode active material and an optional conductive additive mixed with a first liquid electrolyte;
(C) continuously supplying an anode electrode, which contains a pre-lithiated or pre-sodiated anode active material;
(D) stacking said anode electrode, a porous separator, and said cathode electrode to form said lithium-ion capacitor or sodium-ion capacitor, wherein said cathode electrode has a thickness no less than 100 μm and said cathode active material constitutes an electrode active material loading no less than 7 $mg/cm^2$ in said cathode electrode.

* * * * *